United States Patent [19]
Kotani

[11] Patent Number: 6,157,387
[45] Date of Patent: Dec. 5, 2000

[54] IMAGE GENERATING APPARATUS AND METHOD

[75] Inventor: Naoya Kotani, Tokyo, Japan

[73] Assignee: Nippon Telegraph and Telephone Corporation, Japan

[21] Appl. No.: 09/089,085

[22] Filed: Jun. 2, 1998

[30] Foreign Application Priority Data

Jun. 2, 1997 [JP] Japan .................................. 9-144024
Aug. 12, 1997 [JP] Japan .................................. 9-217725

[51] Int. Cl.[7] ............................................. G06T 15/00
[52] U.S. Cl. ........................ 345/431; 345/420; 345/421; 345/422
[58] Field of Search ..................... 345/420, 421, 345/422, 431, 418, 419, 426, 433, 427

[56] References Cited

U.S. PATENT DOCUMENTS

| 5,345,541 | 9/1994 | Kelly | 345/426 |
|---|---|---|---|
| 5,517,603 | 5/1996 | Kelly | 345/426 |
| 5,570,433 | 10/1996 | Nagamine | 348/347 |
| 5,706,415 | 1/1998 | Kelly | 345/426 |
| 5,805,782 | 9/1998 | Foran | 345/430 |
| 5,917,496 | 6/1999 | Fujita | 345/422 |
| 5,920,320 | 7/1999 | Shimizu | 345/422 |
| 5,923,332 | 7/1999 | Izawa | 345/423 |
| 5,949,433 | 9/1999 | Klotz | 345/419 |
| 5,982,376 | 11/1999 | Abe | 345/422 |
| 5,982,398 | 11/1999 | Yamamoto | 345/422 |
| 5,986,659 | 11/1999 | Gallery | 345/419 |
| 6,016,151 | 1/2000 | Lin | 345/422 |

FOREIGN PATENT DOCUMENTS

| 6-231273 | 8/1994 | Japan . |
|---|---|---|
| 8-36652 | 2/1996 | Japan . |
| WO 96/14621 | 5/1996 | WIPO . |

OTHER PUBLICATIONS

Potmesil et al., "A Lens and Aperture Camera Model for Synthetic Image Generation," Computer Graphics, vol. 15, No. 3, Aug. 1981, pp. 297–305.

Potmesil et al., "Synthetic Image Generation with a Lens and Aperture Camera Model," ACM Transactions on Graphics, vol. 1, No. 2, Apr. 1982, pp. 85–108.

Cook et al., "Distributed Ray Tracing," Computer Graphics, vol. 18, No. 3, Jul. 1984, pp. 137–145.

M. Shinya, "Post–Filtering for Depth of Field Simulation with Ray Distribution Buffer," Graphics Interface, 1994, pp. 59–66.

Primary Examiner—Jeffery Brier
Assistant Examiner—Wessner Sajous
Attorney, Agent, or Firm—Pennie & Edmonds LLP

[57] ABSTRACT

An image generating apparatus comprising a multi-plane buffer comprising a plurality of planes, and can record R, G, B, A and Z values as pixels, and a multi-plane buffer processor which stores in said multi-plane buffer in sequence from closest distance from a vantage point a plurality of defocus data which is data consisting of object model data that has been at least coordinate converted, hidden surface processed, and defocus processed, and which assigns R, G, B, A and Z values to each pixel, this object model data being derived from an object whose positional relationships are to be represented from a vantage point using depth of field, which is the effective focus range within which the object is focused.

57 Claims, 21 Drawing Sheets

SEEN FROM A VANTAGE POINT

FIGURE SEEN FROM
ABOVE POINT OF VIEW

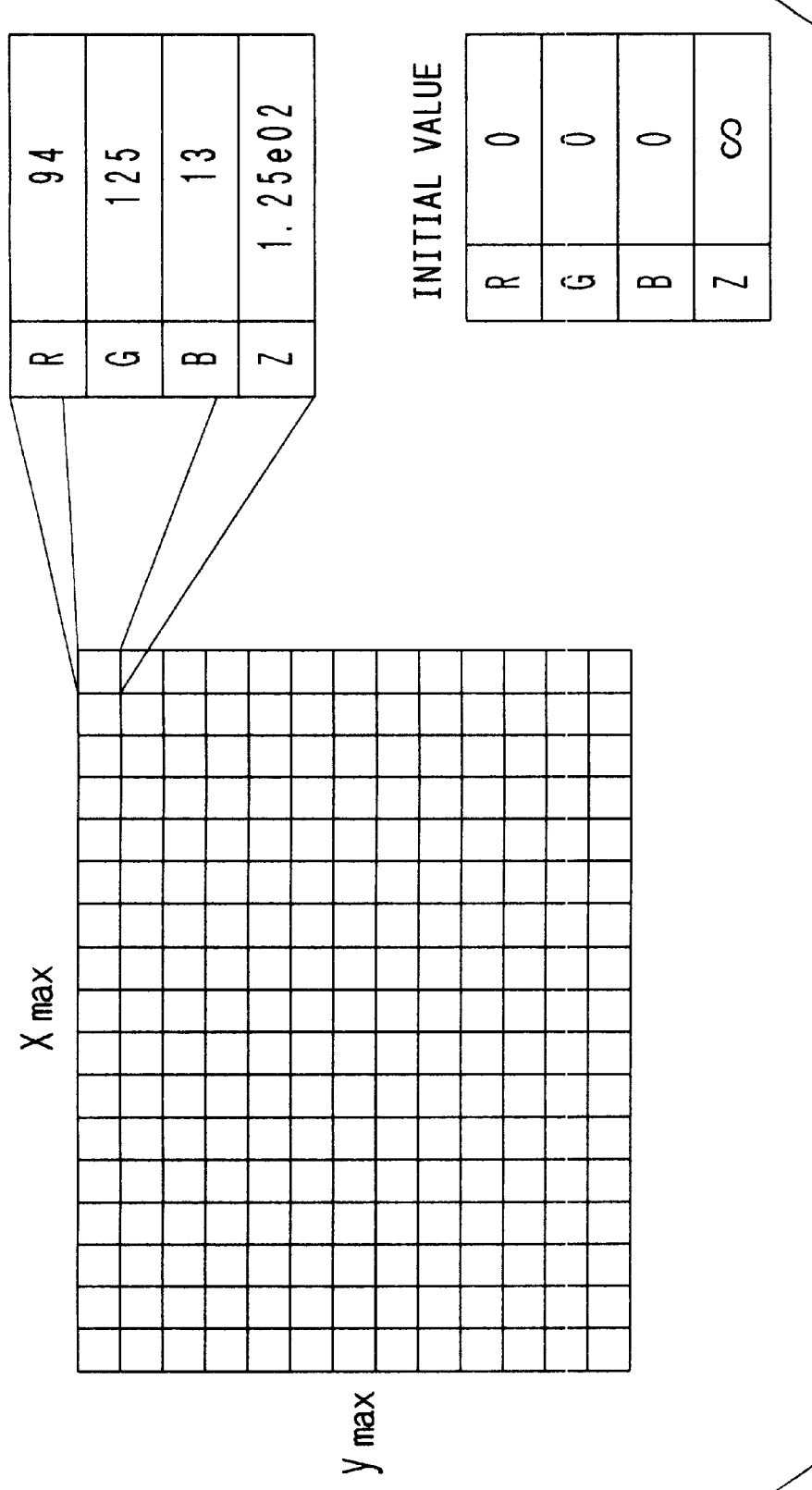

FIG.5A  IMAGING RELATIONSHIP BY GEOMETRIC OPTICS
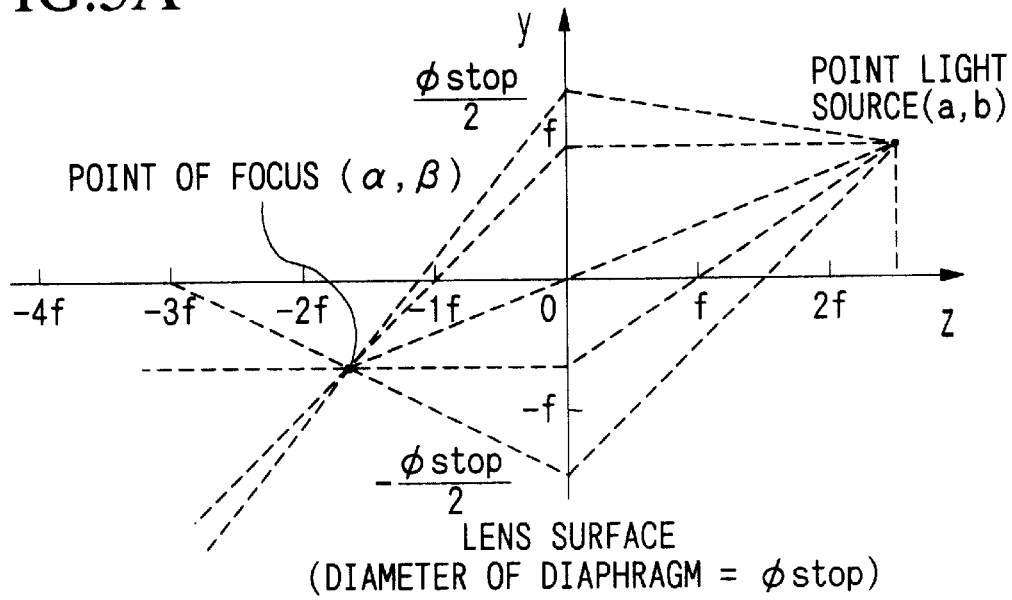
FIG.5B  CASE OF THE IMAGE OF THE POINT LIGHT SOURCE IMAGING FROM FILM SURFACE TO BACK
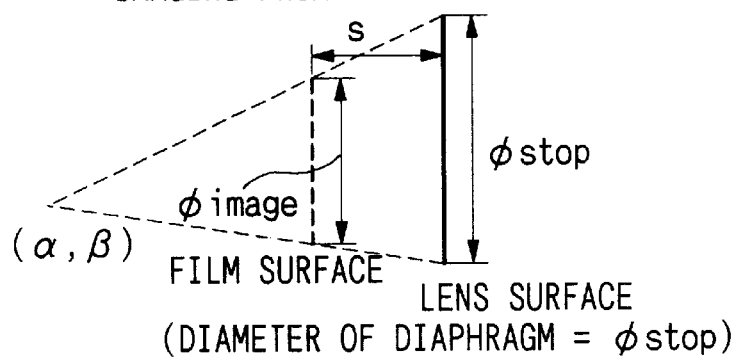
FIG.5C  CASE OF IMAGE OF THE POINT LIGHT SOURCE IMAGING FROM FILM SURFACE TO FRONT
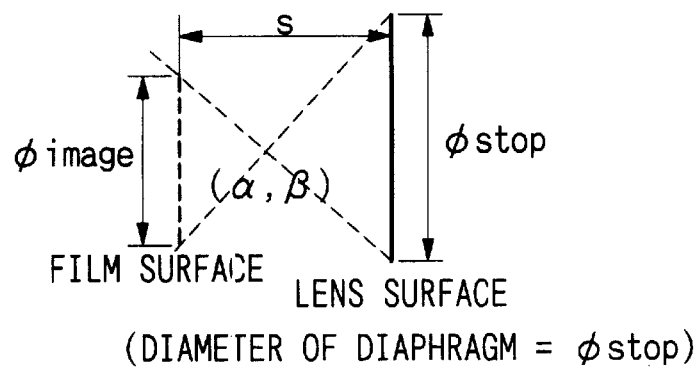

FIG.9

DEFOCUS BUFFER 6

| (X, Y) | | | | |
|---|---|---|---|---|
| $Z_d(X,Y)$ | $R_d(X,Y)$ | $G_d(X,Y)$ | $B_d(X,Y)$ | $A_d(X,Y)$ |

COMPARE THE Z-VALUE OF THE (X, Y) COORDINATE OF THE DEFOCUS BUFFER 6 WITH THE Z-VALUE ($Z_m(X,Y)_{\#1} \sim Z_m(X,Y)_{\#n}$) OF THE SAME (X, Y) COORDINATE OF THE MULTI-PLANE BUFFER 8.

MOVE THE DATA OF THE (X, Y) COORDINATE OF THE DEFOCUS BUFFER 6 TO THE PLANE WHERE $Z_m(X,Y)_{\#1} \leqq Z_m(X,Y)_{\#2} \leqq \cdots \leqq Z_m(X,Y)_{\#n}$ IS SATISFIED AND MOVE BEHIND ONE BY ONE.

MULTI-PLANE BUFFER 8

| n | (X, Y) | | | | |
|---|---|---|---|---|---|
| #1 | $Z_m(X,Y)_{\#1}$ | $R_m(X,Y)_{\#1}$ | $G_m(X,Y)_{\#1}$ | $B_m(X,Y)_{\#1}$ | $A_m(X,Y)_{\#1}$ |
| #2 | $Z_m(X,Y)_{\#2}$ | $R_m(X,Y)_{\#2}$ | $G_m(X,Y)_{\#2}$ | $B_m(X,Y)_{\#2}$ | $A_m(X,Y)_{\#2}$ |
| #3 | $Z_m(X,Y)_{\#3}$ | $R_m(X,Y)_{\#3}$ | $G_m(X,Y)_{\#3}$ | $B_m(X,Y)_{\#3}$ | $A_m(X,Y)_{\#3}$ |
| #4 | $Z_m(X,Y)_{\#4}$ | $R_m(X,Y)_{\#4}$ | $G_m(X,Y)_{\#4}$ | $B_m(X,Y)_{\#4}$ | $A_m(X,Y)_{\#4}$ |
| ... | | | | | |
| #n | $Z_m(X,Y)_{\#n}$ | $R_m(X,Y)_{\#n}$ | $G_m(X,Y)_{\#n}$ | $B_m(X,Y)_{\#n}$ | $A_m(X,Y)_{\#n}$ |

$Z_m(X,Y)_{\#1} \leqq Z_m(X,Y)_{\#2} \leqq Z_m(X,Y)_{\#3} \leqq Z_m(X,Y)_{\#4} \leqq \cdots \leqq Z_m(X,Y)_{\#n}$

FIG.15
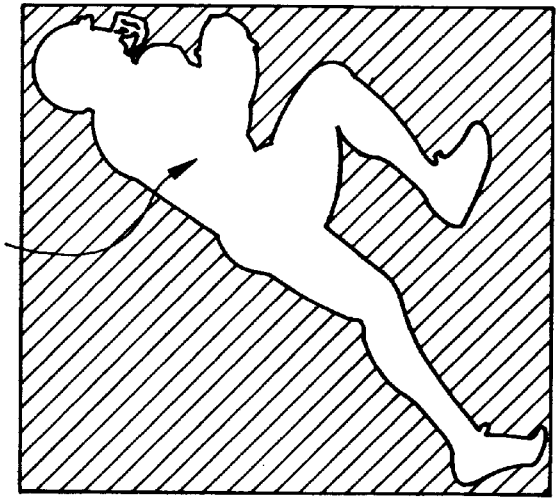
IN THIS AREA, THE R, G, B OF THE ORIGINAL IMAGE AND THE Z-VALUE DESIGNATED BY THE USER ARE GIVEN.
↑ EXTRACTION OF MATTE AREA BY GIVEN THRESHOLD VALUE
GIVING (R, G, B, Z) = (0, 0, 0, ∞) TO THE MATTE AREA
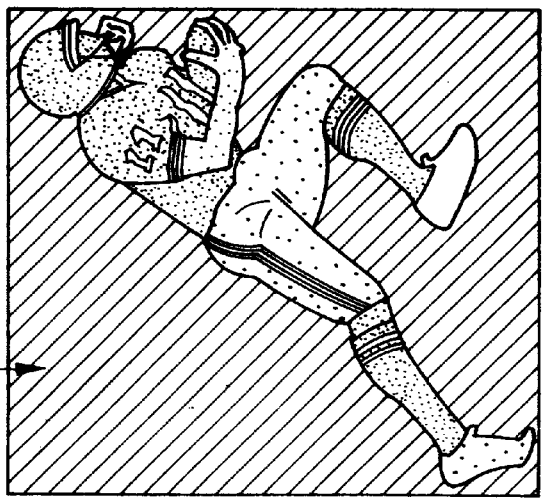
MATTE AREA
ORIGINAL IMAGE READ FROM THE MEMORY APPARATUS 11

FIG.17
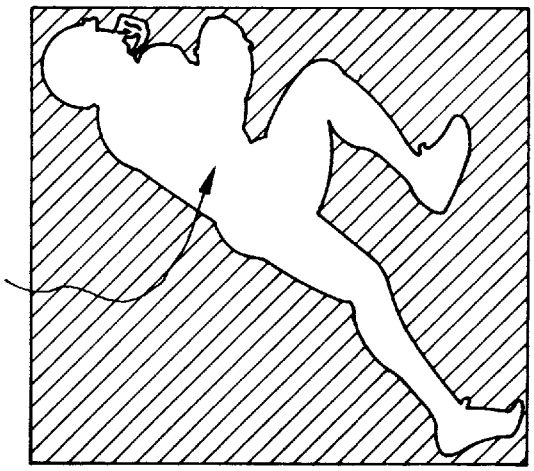
IN THIS AREA, THE R, G, B OF THE ORIGINAL IMAGE, THE A-VALUE CALCULATED BY THE PROCESSOR 17 AND Z-VALUE DESIGNATED BY THE USER ARE GIVEN.
↑ EXTRACTION OF MATTE AREA BY GIVING THRESHOLD VALUE
GIVING (R, G, B, A, Z) = (0, 0, 0, 0, ∞) TO THE MATTE AREA
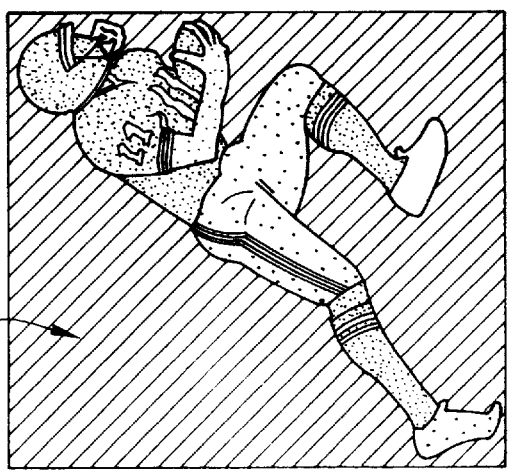
MATTE AREA
ORIGINAL IMAGE READ FROM MEMORY APPARATUS 11

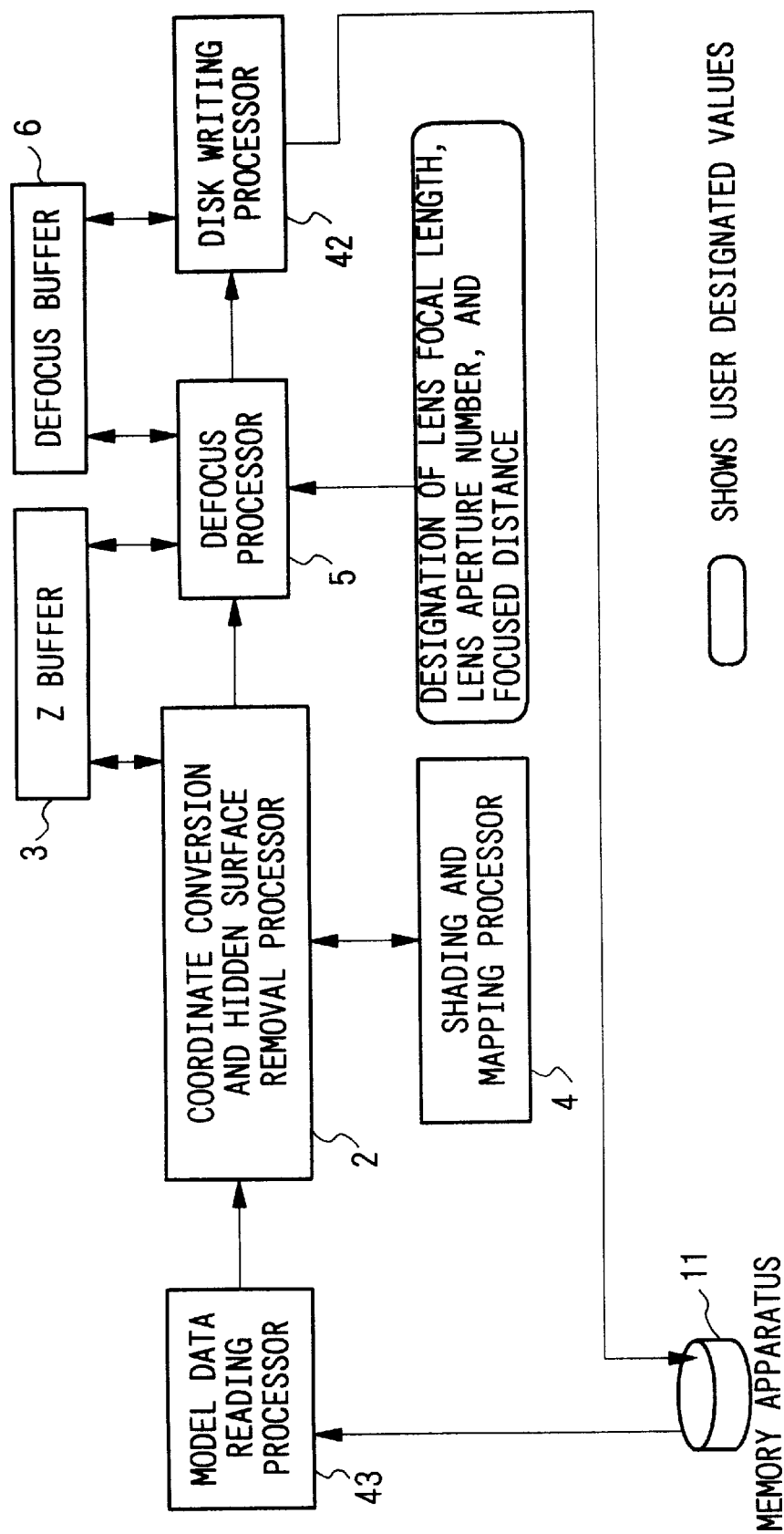

IMAGE GENERATING APPARATUS AND METHOD

BACKGROUND OF THE INVENTION

1. Field of the Invention

The present invention relates to an image generating apparatus and method, in particular an image generating apparatus and method that can quickly generate an image having a natural depth of field and can control the depth of field.

This application is based on patent number Hei 9-144024 and Hei 9-217725 filed in Japan, the contents of which are incorporated herein by reference.

2. Description of Related Art

Conventionally, there are two methods for achieving a realistic depth of field when generating an image by computer graphics: (1) applying a defocus filter to defocus a picture whose entire area focused when generated by conventional methods, (see Potmesil, Michael, et al. "A Lens and Aperture Camera Model for Synthetic Image Generation", *Computer Graphics,* vol. 17, pp. 137–145, 1981.), and (2) applying distributed ray tracing (see Cook, R. L. et al. "Distributed Ray Tracing", *Computer Graphics, vol.* 118, pp. 137–145, 1984). One of the most important characteristics which a natural depth of field has when actually seen is that the image of a physical object in front of the focussed distance is defocused and, at the same time, is transparent at the edge. In the first method mentioned above, because a defocused picture is generated by removing all hidden surfaces, no matter how much this kind of object in front of the focussed distance is defocused, it is fundamentally impossible to make the objects in front of it appear transparent, and as a result, there is the problem that an unnatural picture is generated. Additionally, in the second method mentioned above, while this kind of problem basically does not occur, its basis is distributed ray tracing which by nature is very time consuming, and it is necessary to trace at least tens of rays, giving rise to the problem that a great amount of time is necessary to generate the desired image.

Additionally, generally no matter what method is used, in order to make a composite after a plurality of images has been generated, by the conventional technology the composite borders must be made distinct, and the objects composited in front must be generated in focus, and the edges of the image of this object must be made distinct. If the composited objects in front are to be defocused, they must be composited with skilled manual work, and therefore, the amount of work for moving images is extremely large. In order to avoid this, generally when photographing objects beforehand, they all had to be photographed from front to back so that they were in focus (below called "pan-focus"), and the limitations in conditions for photography were very restrictive.

SUMMARY OF THE INVENTION

The object of the present invention is to provide an image generation apparatus and method which can quickly generate images having a natural depth of field.

In order to achieve this object, we provide an image generation apparatus, method, and image generation program recorded in a recording medium provided with a multi-plane buffer comprising a plurality of planes which can record the values of R, G, B, A, and Z as pixel values, and a multi-plane buffer processor which can store a plurality of defocus data which is data consisting of object model data that has been at least coordinate converted, hidden surface processed, and defocus processed, and which assigns R, G, B, A and Z values to each pixel, this object model data being derived from an object whose positional relationships are to be represented from a vantage point by using depth of field, which is the effective focus range within which the object is in focus.

In this manner, by using a plurality of defocus data on the multi-plane buffer, the image of a largely defocused physical body which is in front of the focussed distance appears with transparent edges at the same time it is defocused, making possible the generation at high speed of an image having a natural depth of field. in addition, another object of the present invention is to provide an image generating apparatus and method which can control the depth of field by control methods (focal length of the lens, aperture number, and focussed distance) which are the same as photographing using an actual camera.

To achieve this object, the present invention provides an image generating apparatus, method, and image generation program recorded in a recording medium using a multi-plane buffer comprising a plurality of planes which can store a plurality of defocus data which is data consisting of object model data that has been at least coordinate transformed, hidden surface processed, and defocus processed, and which assigns R, G, B, A and Z values to each pixel, this object model data being derived from an object whose positional relationships are to be represented from a vantage point by using depth of field, which is the effective focus range within which the object is in focus.

In this manner, using the method of control of an actual camera (focussed length of the lens, aperture number, and focussed distance), it is possible to control the image having a natural depth of field which is the same as an actual photograph.

BRIEF DESCRIPTION OF THE DRAWINGS

FIG. 3 shows the format and initial values of the Z buffer 3.

FIGS. 5A–C are explanatory diagrams of the defocus processing by geometrical optics.

FIG. 9 shows the concept of multi-plane buffer processing.

FIG. 15 shows the concept of matte area extraction processing and RGBZ conversion processing in the third embodiment.

FIG. 17 shows the concept of matte area extraction processing and RGBAZ conversion processing in the fourth embodiment.

FIG. 21 is a structural diagram of the image generating apparatus of the tenth embodiment of the present invention.

DESCRIPTION OF PREFERRED EMBODIMENTS

Figure 1:
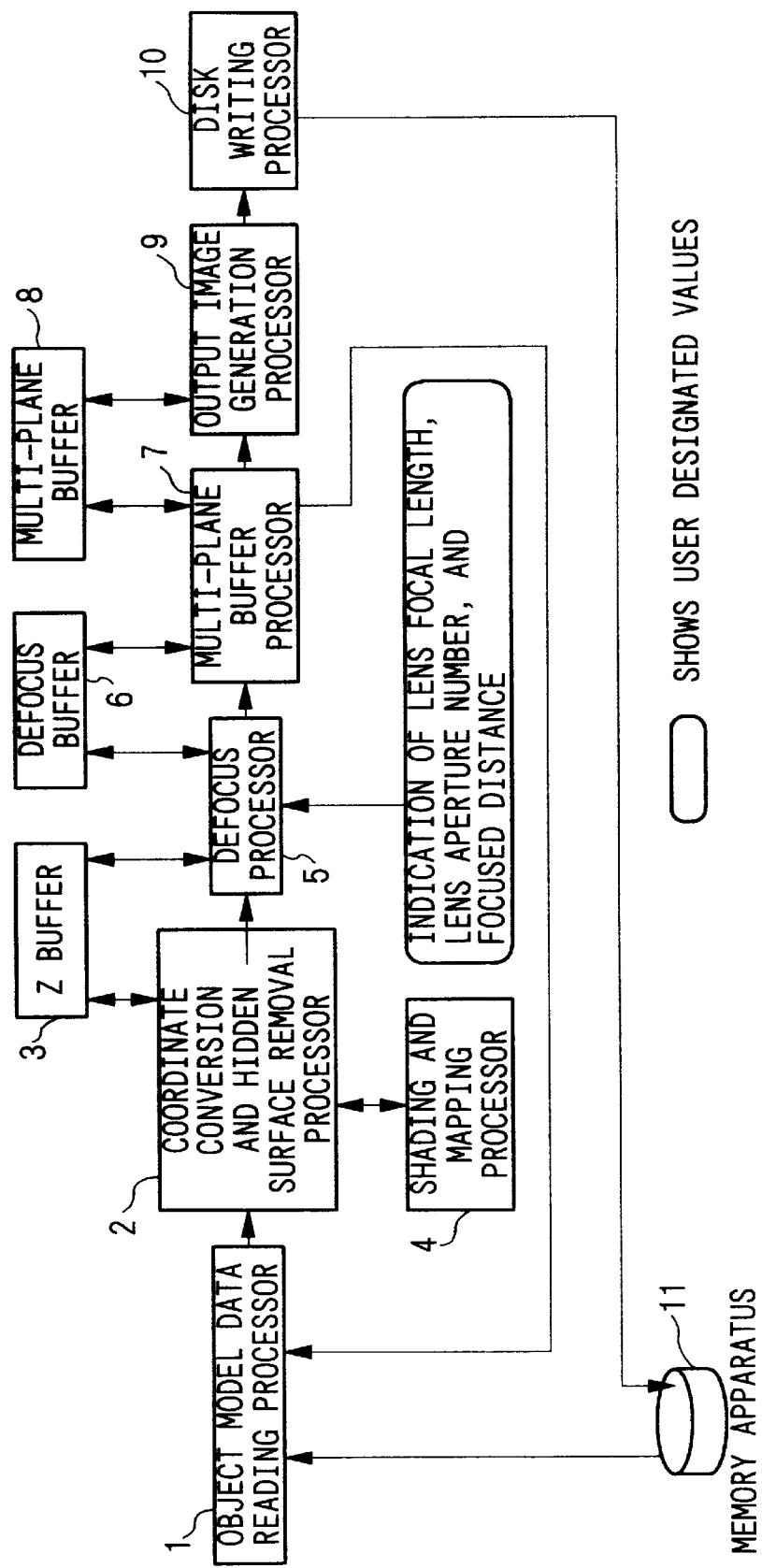
FIG. 1 is a structural diagram of the image generating apparatus of the first embodiment of the present invention.

Next, the preferred embodiments of the present invention will be explained with reference to the figures.

[First Embodiment]

The image generating apparatus of the first embodiment comprises an object model data reading processor 1, a coordinate conversion and hidden surface removal processor 2, a Z buffer 3, a shading and mapping processor 4, a defocus processor 5, a defocus buffer 6, a multi-plane buffer processor 7, a multi-plane buffer 8, an output image generation processor 9, a disk writing processor 10, and a memory apparatus 11.

Figure 2A:
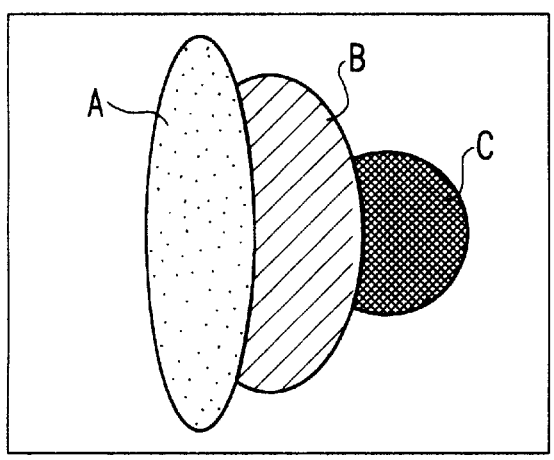
FIGS. 2A and 2B show the concept of the object.
Figure 2B:
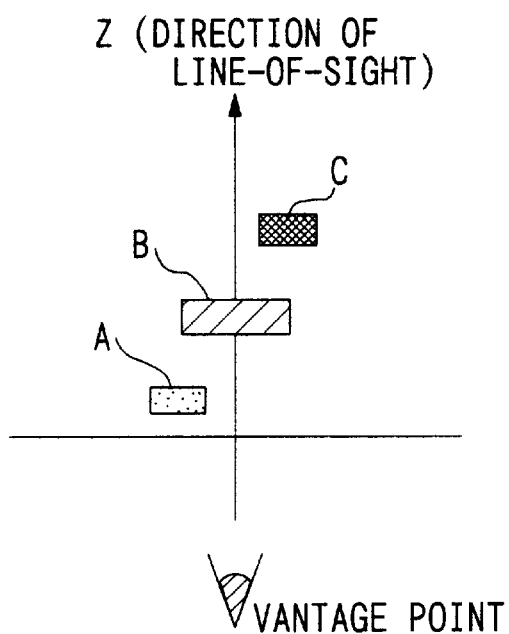

The object model data reading processor 1 reads from the memory apparatus 11 the object model data for each object whose positional relationships are to be represented using the depth of field, and sends the data next to the coordinate conversion and hidden surface removal processor 2. The concept of an object is illustrated in FIGS. 2A and 2B. An object is usually represented by an arrangement (object model data) of a plurality of polygons and basic forms (called "primitives" below). As shown in FIGS. 2A and 2B, the three objects A, B, and C exist, and when the positional relationships between A, B, and C are represented by depth of field, here object model data is read for each of A, B, and C, and then this data sent to the coordinate conversion and hidden surface removal processor 2. For each object read, the following processing is carried out. After the multi-plane processing explained below is finished, the next object is read, and this processing continues until there are no more objects.

Moreover, "depth of field" as used here means the focussed range from front to back, within which focus is effectively adjusted.

The coordinate conversion and hidden surface removal processor 2 carries out coordinate conversion, hidden surface removal, and shading, etc., for each object sent from the object model data reading processor 1. This coordinate conversion and surface removal processor 2 can be a general computer graphics image generating apparatus.

Coordinate conversion is processing that converts the object model data to be processed into each coordinate system to which the processing is applied. As one example, it is the processing that transforms an object represented with a body coordinate system into the coordinates of a world coordinate system, a vantage point coordinate system, or a screen coordinate system. Here "body coordinate system" denotes a coordinate system in which the coordinate origin and coordinate axes are those into which the data related to each object can be input into most easily. Moreover, this body coordinate system is sometimes called the object coordinate system or the model coordinate system. The "world coordinate system" means a coordinate system selected so that the origin and the coordinate axes make the object of the body coordinate system easy to dispose and move. The "vantage point" coordinate system means a coordinated system in which the position of the vantage point with respect to the world coordinate system is the origin, and the direction of the line of sight of Z-axis. The "screen coordinate system" is the coordinate system for projecting data in a line of sight coordinate system onto a screen. These coordinate conversions are generally carried out by a fine conversion.

In addition, "hidden surface removal" means processing in which the parts that cannot be seen from a vantage point are removed. The Z buffer method, the scan line method, and the ray-tracing method are examples of methods for hidden surface removal. Moreover, in the embodiments, an example of hidden surface removal by the Z buffer method is given. Here, the "Z buffer method" means a method of carrying out hidden surface removal by using a recordable Z buffer in which a Z value related to the distance from the vantage point is compared to the Z value of a pixel in the Z buffer corresponding to the distance from the vantage point to each point of each object, and if the distance to the point of the object is smaller (closer to the vantage point) than the Z value in the Z buffer, the color data for a pixel and the Z value corresponding to the Z buffer is overwritten.

The shading and mapping processor 4 caries out processing such as shading and mapping of the object whose coordinates have been converted and hidden surfaces removed. The shading and mapping processor 4 can be a general computer graphics image generating apparatus.

Here, "shading" denotes processing to determine the color affixed to a pixel based on the various elements which comprise the colors of the object that can be seen with the eyes, that is, the condition of the original color and surface of the object, the normal vector of a point on the surface, the position and color of a light source, the position of the vantage point, the direction of the line of sight, and the reflection of surrounding objects, etc. This shading algorithm is generally called a shading model, and examples of shading models are the Lambert model, the Phong shading model, the Blinn shading model, etc.

"Mapping" means the processing for representing the appearance of the surface of an object by projecting planar mapping data onto the surface of an object having a three dimensional form. Examples of mapping methods include, for example, surface mapping and solid mapping.

Moreover, the shading and mapping processor 4 carries out shading processing for an object whose coordinates have been converted and whose hidden surfaces have been removed. When processing such as mapping is necessary for the processed object, the shading and mapping processor 4 also carries out the necessary processing.

The image generated for each object is stored in a Z buffer 3 whose general format is shown in FIG. 3, and next sent to the defocus processor 5. At the beginning of the processing, all of the (X, Y) of the Z buffer 3 are initialized to the initial values of FIG. 3. In FIG. 3, the horizontal $x_{max}$ pixel and vertical $y_{max}$ pixel are the size of the resulting image to be obtained.

Figure 4:
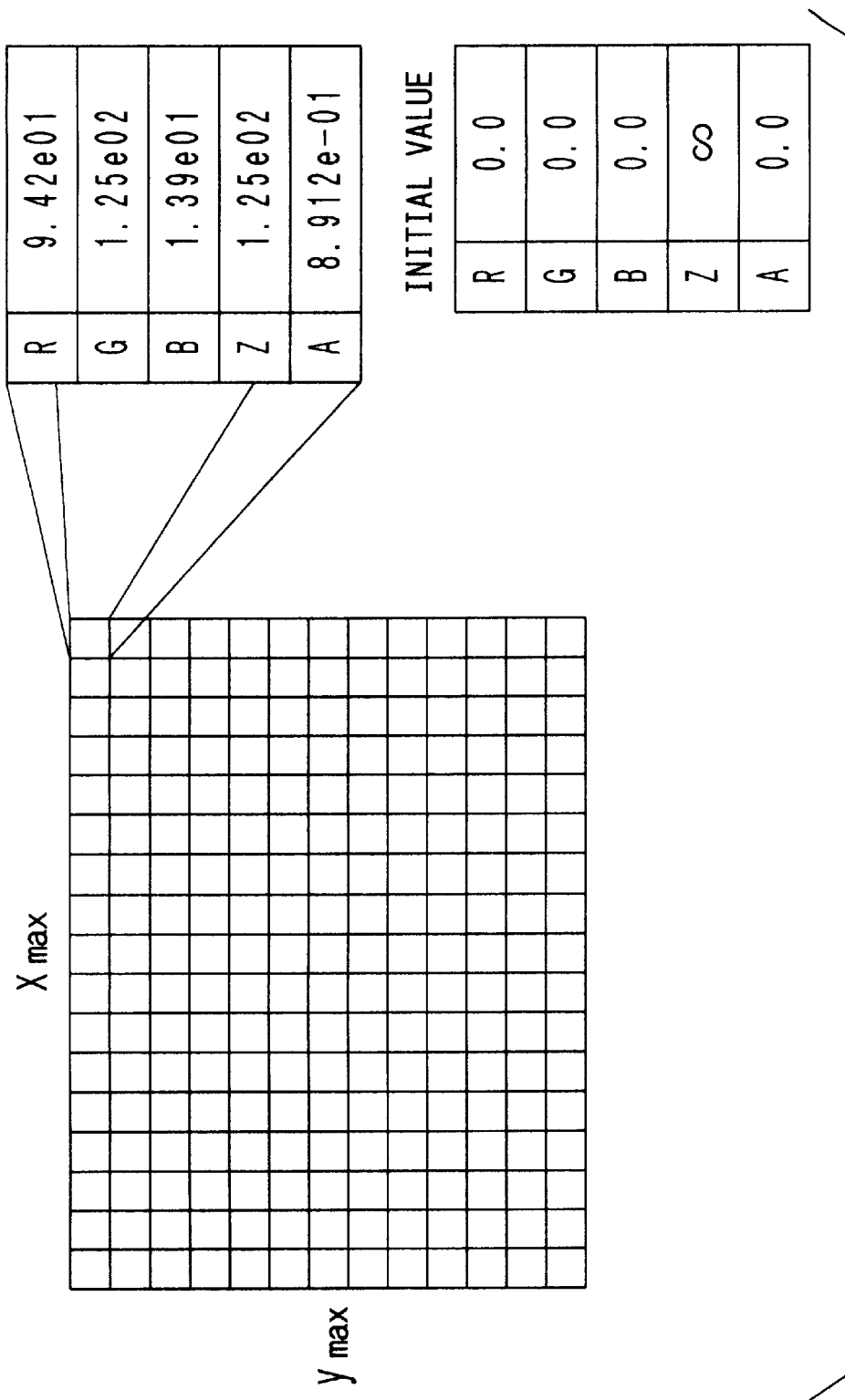
FIG. 4 shows the format and initial values of the defocus buffer 6.
Figure 7:
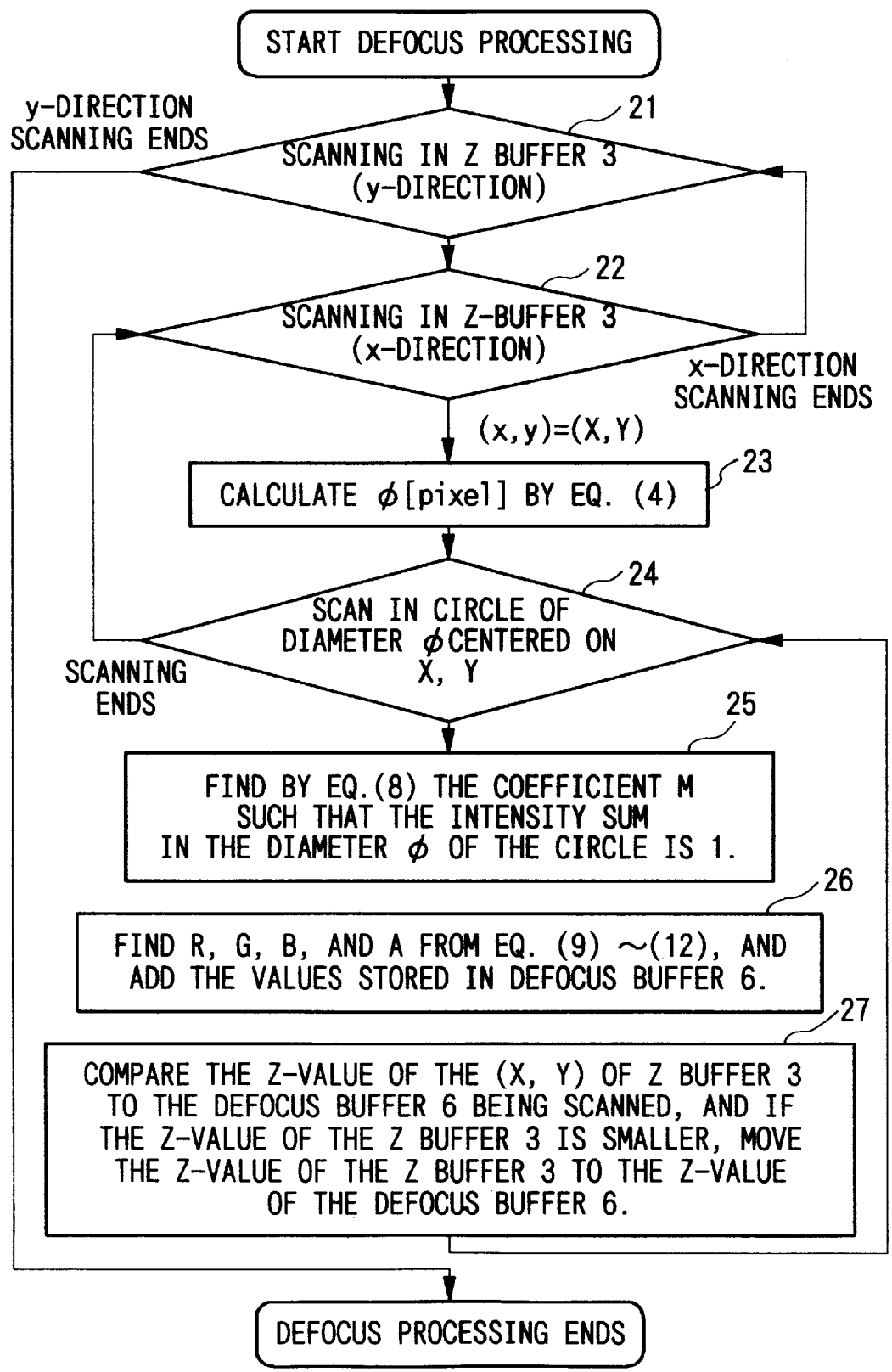
FIG. 7 is a flowchart showing the processing of the defocus processor 5.

The format of the defocus buffer 6 is shown in FIG. 4, and the defocus processing is shown in FIG. 7. $x_{max}$ and $y_{max}$ represent the size of the resulting image to be obtained the number of pixels each in the horizontal and vertical directions. At the time processing begins, R=0.0, G=0.0, and B=0.0, the distance Z from the vantage point to the corresponding point=∞, and the alpha value A=0.0; these values are given to all (x, y). Moreover, the alpha value A takes a value from 0 to 1, and its value is found by a calculation method explained in detail later.

The defocus processor 5 widens the pixel coordinates (X, Y) which include the object corresponding to Z buffer 3 into the defocus image, and this widened image is the circle of confusion of diameter $\phi$ found by a geometrical optical approach, with the pixel as the unit (step 21~24).

This method will be explained with FIGS. 5A~C. FIGS. 5A~C show two dimensions, but this does not present a problem when explained as follows. In the present embodiment, as shown in FIGS. 5A~C, the lens area and the diaphragm area are identical. It is a general theory of geometrical optics that, as shown in FIG. 5A, the coordinates ($\alpha$, $\beta$) at which the point light source positioned at (z, y)=(a, b) converge to form an image are expressed as follows (always a>f):

$$(\alpha, \beta) = \left( \frac{-af}{a-f}, \frac{-bf}{|b-f|} \right) \tag{1}$$

Next, the point of focus ($\alpha$, $\beta$) is shown in FIG. 5B for the case where it is in front of the film surface, and in FIG. 5C for the case where it is behind the film surface. s is the distance from the surface of the film to the lens so that a point of focus of a point light source at distance $a_0$ is adjusted. That is, it is the distance designated by the user such that the point light source, which is distance $a_0$ from the camera, is in focus. Because $a_0$ is always larger than f, $$s = \frac{a_0 f}{a_0 - f} \tag{2}$$

Using the relationship of similar triangles from FIGS. 5B and 5C, the equation $$|\alpha|:||\alpha|-s| = \phi_{stop}:\phi_{image} \tag{3}$$

$$\phi_{image} = \frac{||\alpha|-s|}{|\alpha|} \phi_{stop}$$

$$= \left| 1 - \frac{a-f}{af} s \right| \phi_{stop}$$

$$= \left| 1 - \frac{a-f}{af} \frac{a_0 f}{a_0 - f} \right| \phi_{stop}$$

$$= \left| 1 - \frac{a-f}{af} \frac{a_0 f}{a_0 - f} \right| \frac{f}{F}$$

is obtained. Here, F is the aperture number (F=f/$\phi_{stop}$), f is the focussed distance of the lens, $\phi_{stop}$ is the diameter of the diaphragm, and $\phi_{image}$ is the diameter of the image of the point light source which appears on the film.

Since the circle of confusion of diameter $\phi_{image}$ obtained here is its actual size, the unit is converted into pixels, and the circle of confusion of diameter $\phi$ of the image actually used is found (step 23).

$$\phi_{film}:\sqrt{x_{max}^2 + y_{max}^2} = \phi_{image}:\Phi \tag{4}$$

$$\Phi = \frac{\sqrt{x_{max}^2 + y_{max}^2}}{\phi_{film}} \phi_{image}$$

$$= \left| \frac{a_0}{a} \cdot \frac{a-f}{a_0 - f} - 1 \right| \cdot \frac{f}{F \cdot \phi_{film}} \cdot \sqrt{x_{max}^2 + y_{max}^2}$$

Here, $a_0$ is the distance from the camera to the focused point light source, a is the distance of the pixel, which is on the relevant object, from the camera (the Z value of the Z buffer 3), f is the focal length of the lens, F is the aperture number, $\phi_{film}$ is the diameter of the circle circumscribed in the photographically effective rectangle of the film, and $x_{max}$ and $y_{max}$ are respectively the number of pixels in the horizontal and vertical directions which form the borders of the image that is being generated.

Next, the diameter found in Eq. 4 is used to calculate the intensity distribution in the image of the circle of confusion of diameter $\phi$. In wave optics, the intensity distribution follows:

$$I_0(l, m) = \left( \frac{2 \cdot \sqrt{l^2 + m^2} \cdot J_1(\sqrt{l^2 + m^2})}{\sqrt{l^2 + m^2}} \right)^2 \tag{5}$$

(Potmesil, Michael et al. "A Lens and Aperture Camera Model for Synthetic Image Generation." *Computer Graphics*, vol. 17, no. 3, pp. 137–145, 1981). Here, (1, m) take coordinates such that the origin (0, 0) is the center of a circular image. In addition, $J_1$ (a) is the Bessel function of the first kind. This equation can be used to calculate the intensity distribution, but in the present invention, because it is not necessary to take into consideration interference and diffraction of the aperture edge, and in order to reduce the amount of processing, the intensity distribution can be found using the following approximate equation:

$$I_0(l, m) = \begin{cases} \frac{1}{2}(\cos(\sqrt{l^2 + m^2}) + 1), & \text{for } \sqrt{l^2 + m^2} \leq \pi \\ 0, & \text{for } \sqrt{l^2 + m^2} > \pi \end{cases} \tag{6}$$

Figure 6:
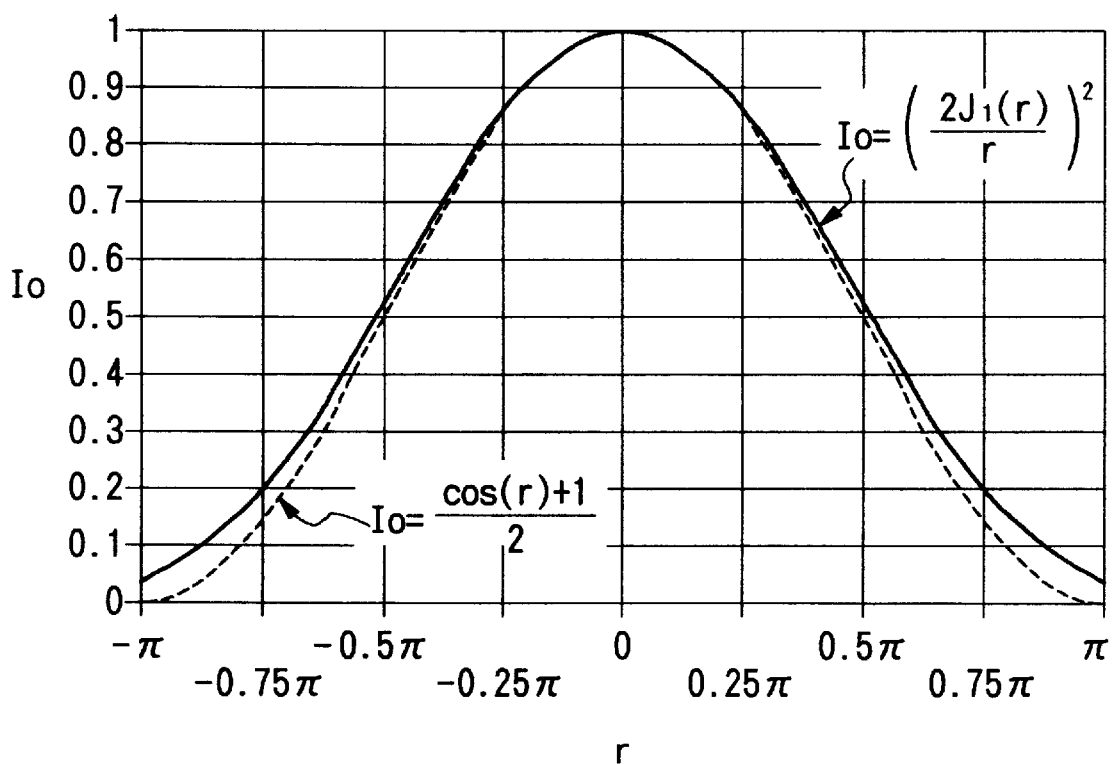
FIG. 6 shows the form of the functions of the defocus processing by wave optics.

The functions of Eq. (5) and (6) are shown in FIG. 6 as. $(l^2+m^2)^{1/2}$=r.

In Eq. 6, because the circular image is centered on the origin, making the diameter $2\pi$, in the defocus buffer 6 it is transformed into a form actually used, that is, a circle of confusion of diameter $\phi$ and center (X, Y). That is, it is used as:

$$I(x, y) = \begin{cases} \frac{1}{2}\left(\cos\left(\frac{2\pi}{\Phi}\sqrt{(x-X)^2 + (y-Y)^2}\right) + 1\right), & \text{for } \sqrt{(x-X)^2 + (y-Y)^2} \leq \frac{\Phi}{2} \\ 0, & \text{for } \sqrt{(x-X)^2 + (y-Y)^2} > \frac{\Phi}{2} \end{cases} \tag{7}$$

Next, by Eq. (7), the sum of the intensities in all pixels in a circle of confusion with center (X, Y) and diameter φ is found, and the coefficient of the intensity M is determined such that this sum is 1.0 (step 25).

$$M = \frac{1}{\sum_{x,y} I(x, y)} \qquad (8)$$

Using the values found above, the image ($R_d$, $G_d$, $B_d$) of a circle of confusion with center (X, Y) and diameter φ, which were obtained by the defocus processing of the pixels of coordinates (X, Y) in the object corresponding to Z buffer 3, is found with the next equation. Moreover, the subscripts z, d, and m attached to R, G, B, A, Z, and R (x, y) are, respectively, the values of the Z buffer 3, the defocus buffer 6, and the multi-plane buffer 8.

$$R_d(x,y) \leftarrow R_d(x,y) + R_z(X,Y) \cdot I(x,y) \cdot M \qquad (9)$$

$$G_d(x,y) \leftarrow G_d(x,y) + G_z(X,Y) \cdot I(x,y) \cdot M \qquad (10)$$

$$B_d(x,y) \leftarrow B_d(x,y) + B_z(X,Y) \cdot I(x,y) \cdot M \qquad (11)$$

At the same time the alpha value A is calculated by using by the input image generation processor 9.

Moreover, the Eqs. (9), (10), and (11) are first given the initial values $R_d$ (x, y), $G_d$ (x, y), and $B_d$ (x, y), and represents the repeated substitution of the calculated value of the right side into the left side.

$$A_d(x,y) \leftarrow A_d(x,y) + I(x,y) \cdot M \qquad (12)$$

In the above manner, the values of R, G, B, and A are calculated for all coordinates on the object corresponding to the Z buffer 3.

For the Z value in (x, y) in the defocus buffer 6, when the Z value in (X, Y) of Z buffer 3 is smaller than the Z value in (x, y) in the defocus buffer 6, the Z value in (X, Y) in Z buffer 3 is moved to the Z value of (x, y) of the defocus buffer 6 (step 27).

Figure 8:
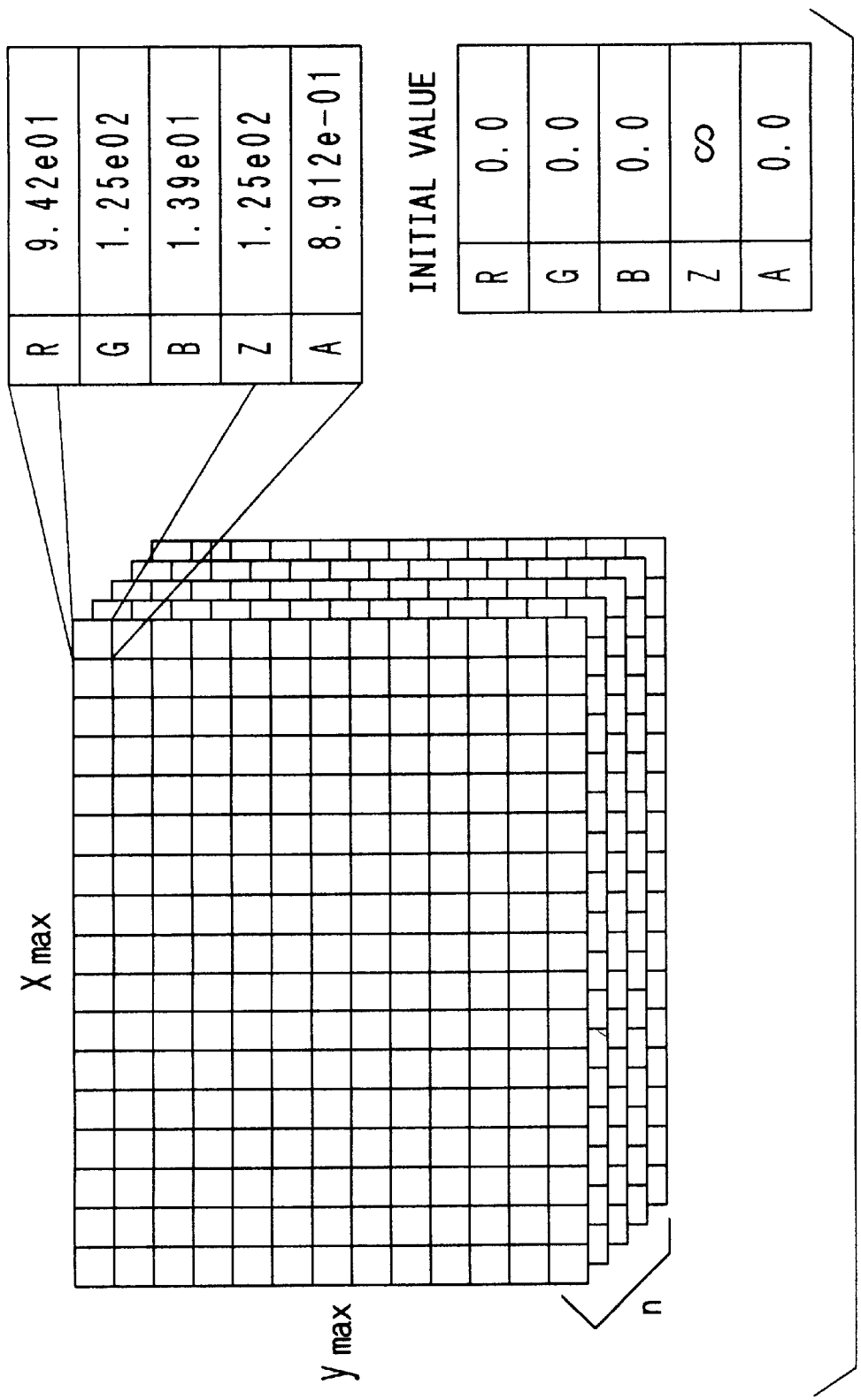
FIG. 8 shows the format and initial values of the multi-plane buffer 8.
Figure 10:
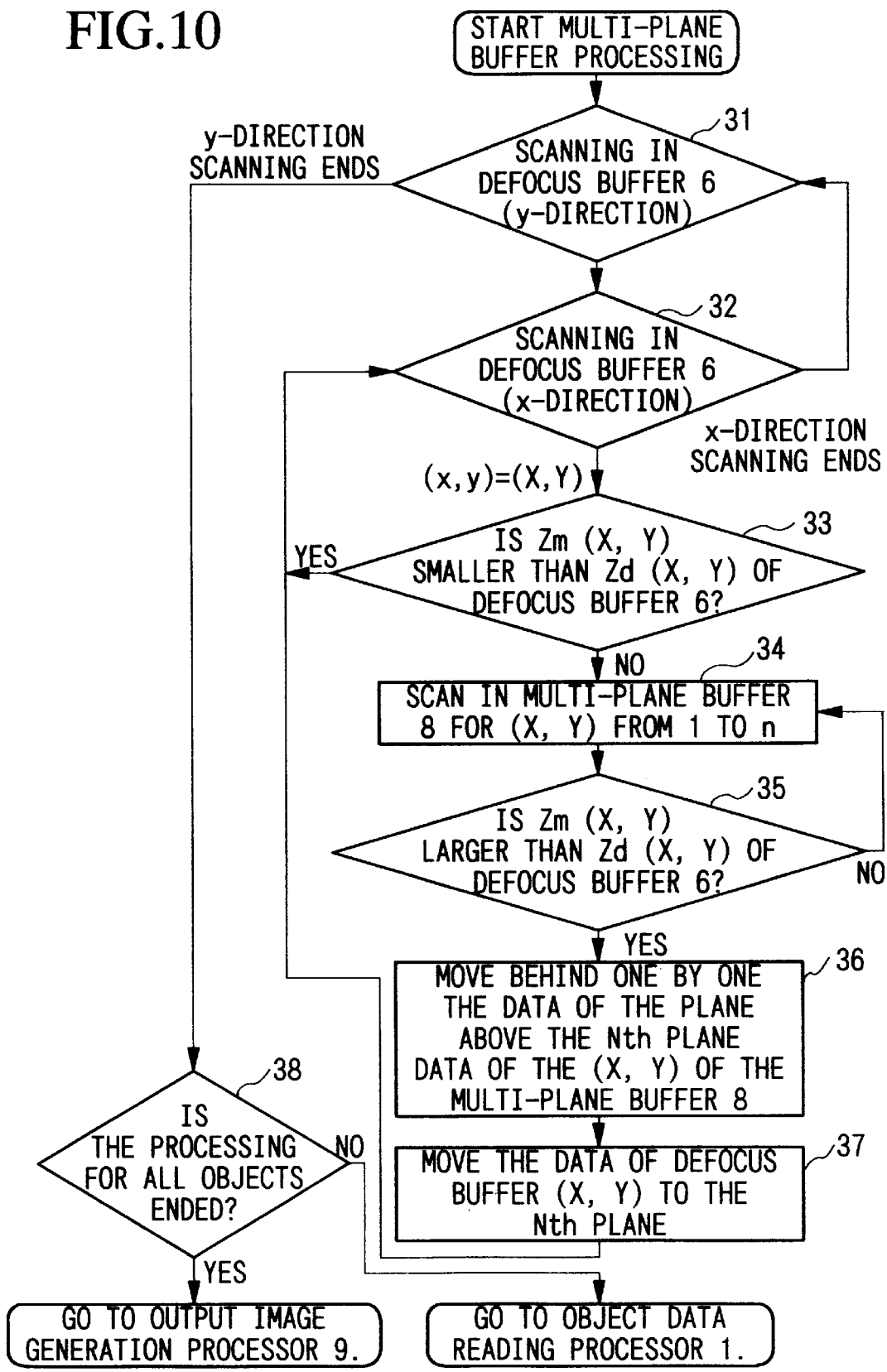
FIG. 10 is a flowchart showing the processing of the multi-plane buffer processor 7.

The format of the multi-plane buffer 8 is shown in FIG. 8, and the multi-plane processor is shown in FIG. 10. $x_{max}$ and $y_{max}$ show the size of the image which is the desired result according to the number of pixels in each of the horizontal and vertical directions. n is the number of planes of the multi-plane buffer 8, the value of which is determined depending on the number of defocused objects which appear to be overlapped in the output image. In the multi-plane buffer 8, for an arbitrary coordinate (x, y) (($0 \leq x < x_{max}$), ($0 \leq y < y_{max}$), for each n, $R_m$ (x, y), $G_m$ (x, y), $B_m$ (x, y), $Z_m$ (x, y), and $A_m$ (x, y) are held. For all n of all (x, y) at the beginning of the processing, $R_m$=0.0, $G_m$=0.0, $B_m$=0.0, $Z_m$=∞, and $A_m$=0.0 are given as the initial values of the multi-plane buffer 8.

All the information R (X, Y), G (X, Y), B (X, Y), Z (X, Y), and A (X,) is transferred from given coordinates (X, Y), included in the object during the processing of the defocus buffer 6, to the coordinates (X, Y), which correspond to the multi-plane buffer 8. An outline of the processing at this step is shown in FIG. 9.

FIG. 9 explains the processing for certain coordinates (X, Y) included in the object during processing. As has already been explained, for certain coordinates (X, Y) of the multi-plane buffer 8, $R_m$ (X, Y), $G_m$ (X, Y), $B_m$ (X, Y), $Z_m$ (X, Y), and $A_m$ (X, Y) are stored on each plane, and are expressed as $R_m$ (X, Y)$_{\#n}$, $G_m$ (X, Y)$_{\#n}$, $B_m$ (X, Y)$_{\#n}$, $Z_m$ (X, Y)$_{\#n}$, and $A_m$ (X, Y)$_{\#n}$. The multi-plane buffer processor 7 controls the multi-plane buffer 8 so that $Z_m$ (X, Y)$_{\#1} \leq Z_m$ (X, Y)$_{\#2} \leq Z_m$ (X, Y)$_{\#3}$ . . . $\leq Z_m$ (X, Y)$_{\#n}$ is always satisfied. For the defocus buffer 6, the multi-plane buffer processor 7 first compares $Z_d$ (X, Y) in the (X, Y) in the defocus buffer 6 with $Z_m$ (X, Y)$_{\#n}$ in the multi-plane buffer 8 (step 33) If the result is $Z_d$ (X, Y)>$Z_m$ (X, Y)$_{\#n}$, the multi-plane buffer processor 7 does not carry out the transfer of the information related to (X, Y) from the defocus buffer 6 to the multi-plane buffer 8. If $Z_d$ (X, Y)$\leq Z_m$ (X, Y)$_{\#n}$ the multi-plane buffer 7 carries out a comparison of $Z_d$ (X, Y) in sequence from $Z_m$ (X, Y)$_{\#1}$ to $Z_m$ (X, Y)$_{\#n}$ (steps 34 and 35). When N which is $Z_d$ (X, Y)<$Z_m$ (X, Y)$_{\#N}$ ($1 \leq N \leq n$) is found, the multi-plane buffer 7 shifts the (R, G, B, Z, and A) which are after N back by one plane, and finally transfers the $R_d$ (X, Y), $G_d$ (X, Y), $B_d$ (X, Y), $Z_d$ (X, Y), and $A_d$ (X, Y) to the $R_m$ (X, Y)$_{\#N}$, $G_m$ (X, Y)$_{\#N}$, $B_m$ (X, Y)$_{\#N}$, $Z_m$ (X, Y)$_{\#N}$, and $A_m$ (X, Y)$_{\#N}$ of the $N^{th}$ multi-plane buffer 8. This processing is carried out for all (X, Y) which are included in the relevant object (steps 31 and 32).

When the processing of the relevant object has finished (step 38), if this object is the last object, the processing moves to the next output image generating processor 9, and if this object is not the last object, then the processing returns to the object model data reading processor 1, the next object model data is read, and each process explained up to this point is carried out.

Here, the number of planes n of the multi-plane plane buffer 8 was explained as a value determined depending on the number of defocused objects which appear to be overlapped in the output image, and allocated in advance in each of n multi-plane buffers 8. However, if the multi-plane buffer 8 can be dynamically allocated, at the initial step only the smallest number of multi-plane buffers (for example, 1 plane) needs to be allocated, and when the number of multi-plane buffer 8 is insufficient during the process in which the information of the plane after the $N^{th}$ plane of step 36 in FIG. 10 is moved to the back by one plane, a plane buffer for the multi-plane buffer 8 can be newly allocated. That is, if the plane number of the current multi-plane buffer 8 is α and number of planes necessary for processing of step 36 is (α+1), a buffer of one new plane can be allocated and initialized, and after the number of planes of the multi-plane buffer 8 is made (α+1), the information of the plane after the $N^{th}$ plane can be moved back one plane each. Moreover, the necessary number of planes of the multi-plane buffer 8 is at the largest equal to the number of objects to be processed.

The output image generating processor 9 carries out the calculation of the following equation for all (x, y) where $0 \leq x < x_{max}$ and $0 \leq y < y_{max}$, and generates an output image.

$$\begin{aligned} R(x, y) = &R_m(x, y)_{\#1} + (1 - A_m(x, y)_{\#1})R_m(x, y)_{\#2} + \\ &(1 - A_m(x, y)_{\#1})(1 - A_m(x, y)_{\#2})R_m(x, y)_{\#3} + \\ &(1 - A_m(x, y)_{\#1})(1 - A_m(x, y)_{\#2}) \ldots \\ &(1 - A_m(x, y)_{\#n-1})R_m(x, y)_{\#n} \end{aligned} \qquad (13)$$

$$\begin{aligned} G(x, y) = &G_m(x, y)_{\#1} + (1 - A_m(x, y)_{\#1})G_m(x, y)_{\#2} + \\ &(1 - A_m(x, y)_{\#1})(1 - A_m(x, y)_{\#2})G_m(x, y)_{\#3} + \\ &(1 - A_m(x, y)_{\#1})(1 - A_m(x, y)_{\#2}) \ldots \\ &(1 - A_m(x, y)_{\#n-1})G_m(x, y)_{\#n} \end{aligned} \qquad (14)$$

$$\begin{aligned} B(x, y) = &B_m(x, y)_{\#1} + (1 - A_m(x, y)_{\#1})B_m(x, y)_{\#2} + \\ &(1 - A_m(x, y)_{\#1})(1 - A_m(x, y)_{\#2})B_m(x, y)_{\#3} + \\ &(1 - A_m(x, y)_{\#1})(1 - A_m(x, y)_{\#2}) \ldots \\ &(1 - A_m(x, y)_{\#n-1})B_m(x, y)_{\#n} \end{aligned} \qquad (15)$$

In the above first embodiment, the R, G, B, and Z values are read from the Z buffer 3, and an defocused image was generated according to a function (Eq. 12) comprising a lens focussed distance, aperture number, and distance from a photographed subject, which are the same as an actual camera. However, an defocused image can also be generated according to a function which includes A as a parameter, comprising the focal length and aperture number for a lens and distance to the photographed subject, which are the same as that for an actual camera:

$$A_d(x,y) \leftarrow A_d(x,y) + A_z(x,y) \cdot I(x,y) \cdot M \qquad (16)$$

Figure 11:
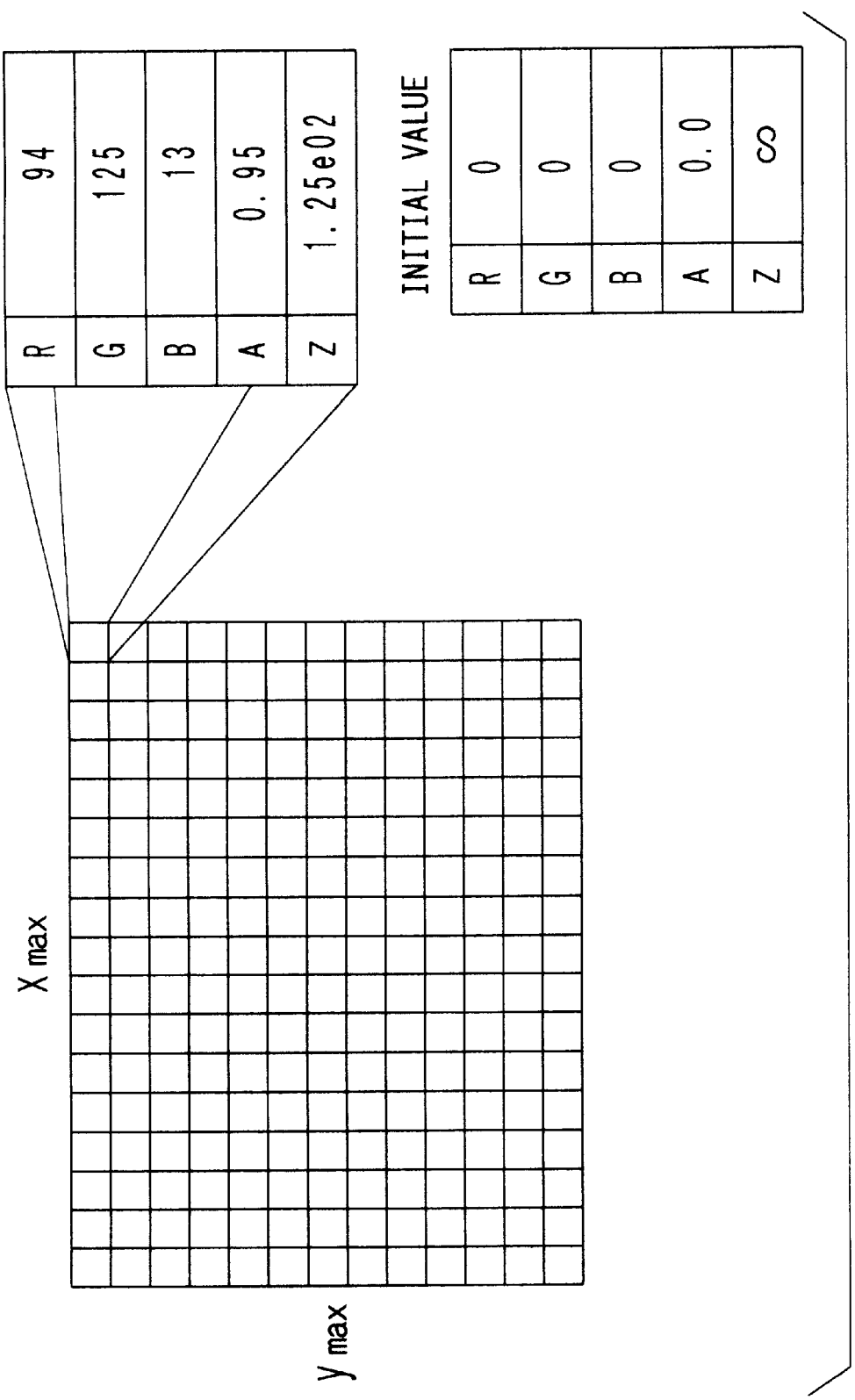
FIG. 11 shows the format and initial values of Z buffer 3 when inputting the values R, G, B, and A from the Z buffer 3, and generating a defocused image.

In this case, the format of the Z buffer 3 and the initial values are as shown in FIG. 11. Here, this means that the value of the left side of Eq. 16 is substituted for the right side, and first the initial value is given as $A_d(x, y)$.

[Second Embodiment]

Figure 12:
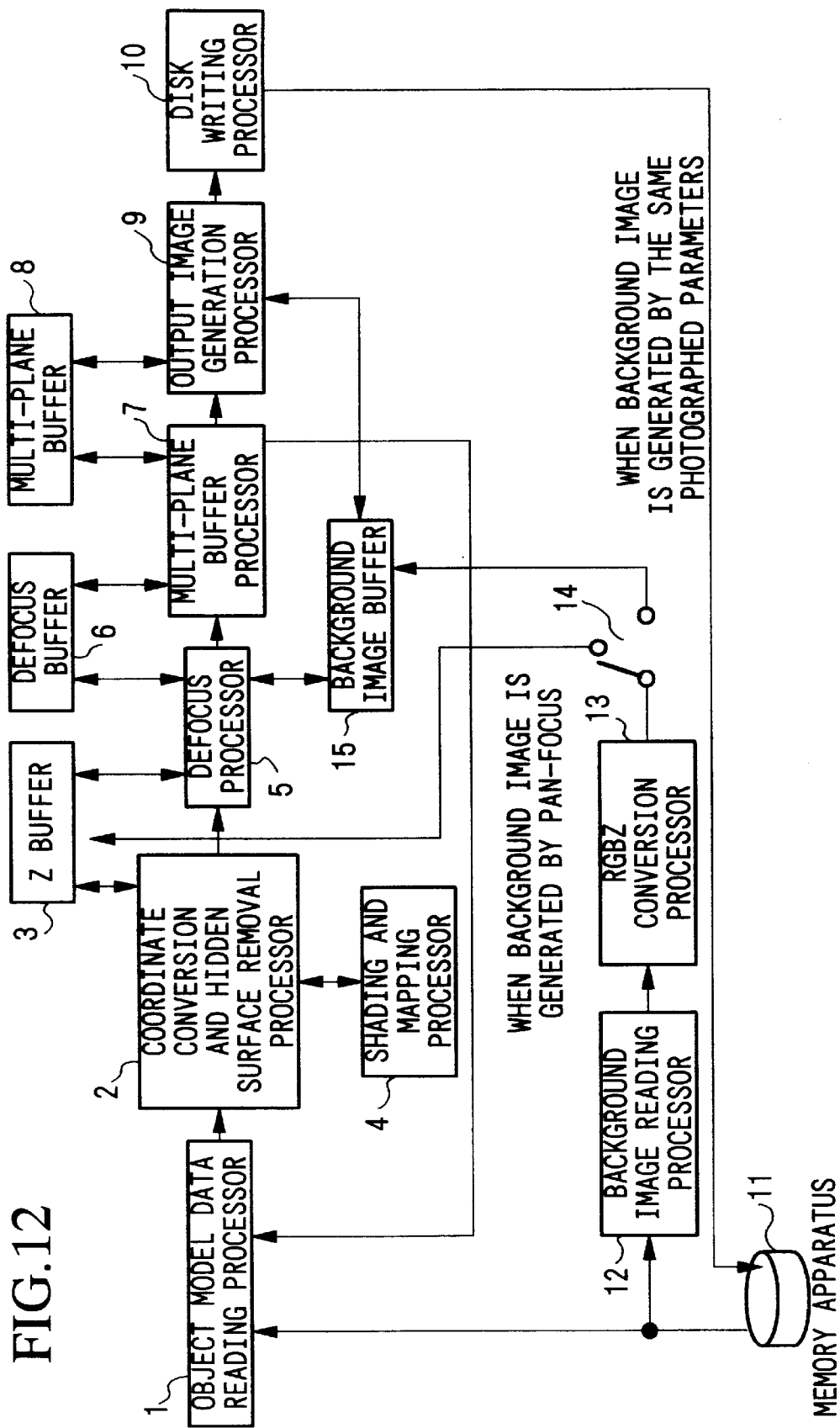
FIG. 12 is a structural diagram of the image generating apparatus of the second embodiment of the present invention.

FIG. 12 is a structural diagram of the image generating apparatus of the second embodiment of the present invention.

The present embodiment is composed by adding a background image reading processor 12, a RGBZ conversion processor 13, a switch 14, and a background image buffer 15 to the first embodiment (FIG. 1). Here, the RGBZ conversion processor 13 carries out processing incorporating the Z values into the R, G, and B information.

The background image reading processor 12 reads the background image from the memory apparatus 11, and if the image file format stored in the memory apparatus 11 is not RGB format, first the image format is converted to RGB format. The explanation of the method of conversion is omitted here because it is the same as generally known methods. If the size of the background image is the same as the size $x_{max}$ and $y_{max}$ of the image being generated, it is sent as is to the RGBZ conversion processor 13, and if not, processing is carried out in which it is adjusted to $x_{max}$ and $y_{max}$. The explanation of the processing method at this stage is omitted here because it is the same as generally known methods.

The background image is theoretically placed at an infinite distance in the generated image. Because of this, infinite distance is produced as the Z value in all coordinates of the background image, and the Z value is added to the R, G, and B information. There are several differences in the subsequent flow depending on whether the background image stored in memory apparatus 11 is generated using the same photographic control parameters (focal length of the lens, aperture number, and focussed distance) as those used by the first embodiment, or generated by pan-focus.

[A. Case of the background image being generated with the same parameters]

Figure 13:
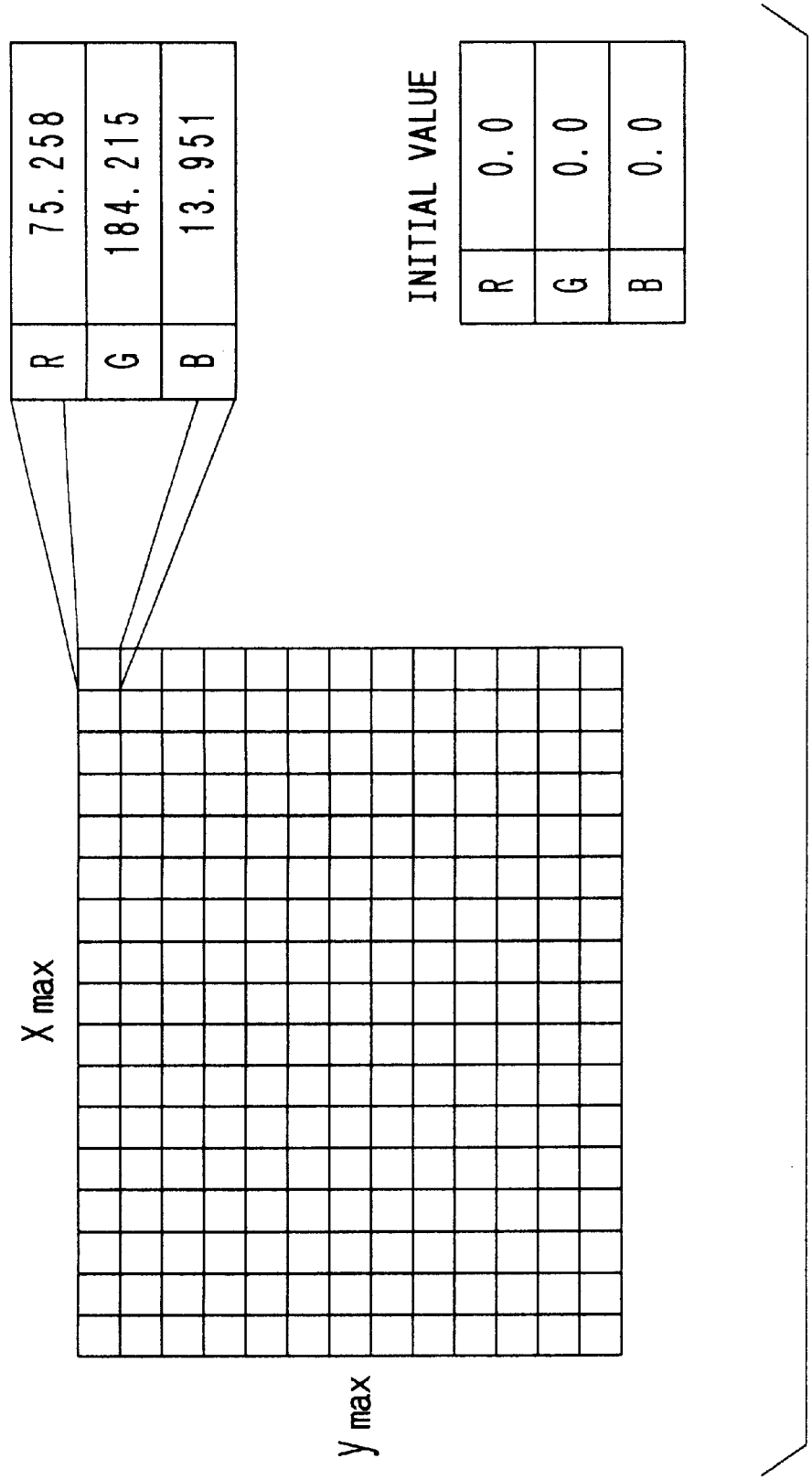
FIG. 13 shows the format and initial values of the background image buffer 15 in FIG. 11.

All the output of the RGBZ conversion processor 13 is moved to the background image buffer 15 via the switch 14. The format of the background image buffer 15 is shown in FIG. 13.

After being moved to the background image buffer 15, image generation according to the first embodiment begins. After multi-plane buffer processing for all objects is finished, the processing in the output image generating processor 9 is different from the first embodiment. Instead of Eqs. 13–14, in the second embodiment output images are generated by the following equation:

$$R(x, y) = R_m(x, y)_{\#1} + (1 - A_m(x, y)_{\#1})R_m(x, y)_{\#2} + \qquad (17)$$
$$(1 - A_m(x, y)_{\#1})(1 - A_m(x, y)_{\#2})R_m(x, y)_{\#3} +$$
$$(1 - A_m(x, y)_{\#1})(1 - A_m(x, y)_{\#2}) \ldots$$
$$(1 - A_m(x, y)_{\#n-1})R_m(x, y)_{\#n} +$$
$$(1 - A_m(x, y)_{\#1})(1 - A_m(x, y)_{\#2}) \ldots$$
$$(1 - A_m(x, y)_{\#n})R(x, y)_{back}$$

$$G(x, y) = G_m(x, y)_{\#1} + (1 - A_m(x, y)_{\#1})G_m(x, y)_{\#2} + \qquad (18)$$
$$(1 - A_m(x, y)_{\#1})(1 - A_m(x, y)_{\#2})G_m(x, y)_{\#3} +$$
$$(1 - A_m(x, y)_{\#1})(1 - A_m(x, y)_{\#2}) \ldots$$
$$(1 - A_m(x, y)_{\#n-1})G_m(x, y)_{\#n} +$$
$$(1 - A_m(x, y)_{\#1})(1 - A_m(x, y)_{\#2}) \ldots$$
$$(1 - A_m(x, y)_{\#n})G(x, y)_{back}$$

$$B(x, y) = B_m(x, y)_{\#1} + (1 - A_m(x, y)_{\#1})B_m(x, y)_{\#2} + \qquad (19)$$
$$(1 - A_m(x, y)_{\#1})(1 - A_m(x, y)_{\#2})B_m(x, y)_{\#3} +$$
$$(1 - A_m(x, y)_{\#1})(1 - A_m(x, y)_{\#2}) \ldots$$
$$(1 - A_m(x, y)_{\#n-1})B_m(x, y)_{\#n} +$$
$$(1 - A_m(x, y)_{\#1})(1 - A_m(x, y)_{\#2}) \ldots$$
$$(1 - A_m(x, y)_{\#n})B(x, y)_{back}$$

Here, $R(x, y)_{back}$, $G(x, y)_{back}$, and $B(x, y)_{back}$ are the values of R, G, and B in the (x, y) coordinates of the background image buffer 15.

[B. Case of background image being generated by pan-focus]

The output of the RGBZ conversion processor 13 is sent to the Z buffer 3 via the switch 14. After completion, defocus processing which is the same as that in the first embodiment is carried out on the whole background image which has been sent to the Z buffer 3. In the second embodiment, the alpha value A is not necessary for the background image, so it is not calculated by Eq. 12. The result of the defocus processing is sent to the background image buffer 15, rather than the defocus buffer 6.

The defocusing processing for the background image finishes, and after the result is stored in the background image buffer 15, image generation according to the first embodiment begins. After the multi-plane buffer processing for all objects ends, processing in the output image generating processor 9 begins. This is carried out according the Eqs. 17~19, the same as the case as the background image being generated with the same photographic parameters.

Moreover, in the present embodiment the image processing apparatus is provided with a background image buffer 15, and the output image generating processor 9 generates the output image by Eqs. 17~19 using the data in the background image buffer 15 and the multi-plane buffer 8. However, when the above-described output data from the background processing buffer 15 has added to it the Z value=∞ and alpha value A=1.0 and is sent to the defocus buffer 8, the processing of the output image processor 9 can process the background image defocused by the multi-plane buffer processor 7 using Eqs. 13~15, which is the same as the processing explained in the first embodiment. In addition, in this manner the background image buffer 15 can be omitted.

[Third Embodiment]

Figure 14:
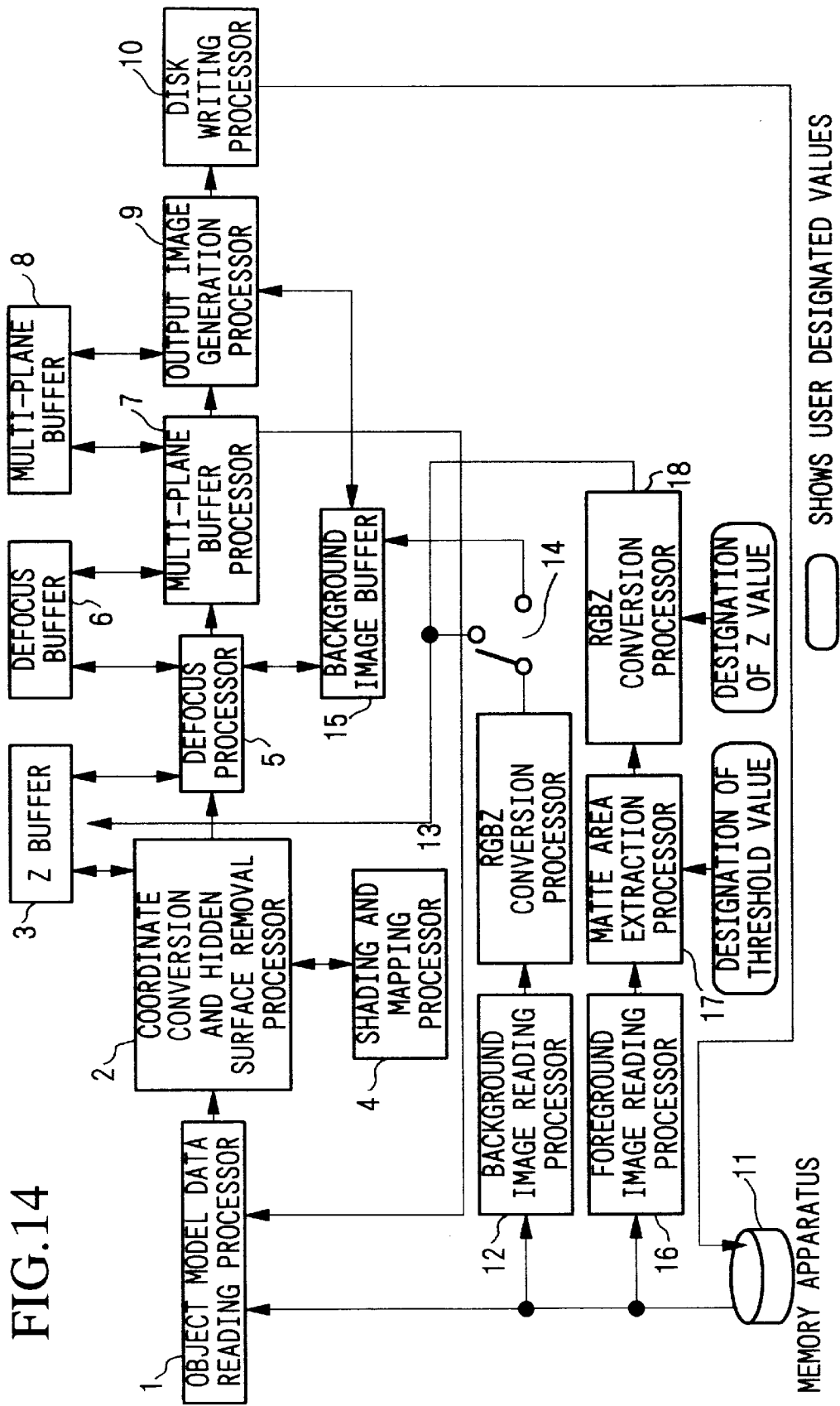
FIG. 14 is a structural diagram of the image generating apparatus of the third embodiment of the present invention.

FIG. 14 is a structural diagram of the image generating apparatus of the third embodiment of the present invention.

The present embodiment is structured by adding to the second embodiment (FIG. 12) a foreground image reading processor 16, a matte area extraction processor 17, and an RGBZ conversion processor 18.

The third embodiment can be executed before the object model data reading processing of the first object as in the second embodiment, or can carry out processing of the next object after finishing the multi-plane buffer processing of a certain object at an arbitrary timing between the beginning and end of the object model data reading, or can execute before the output image generation processing following the end of the multi-plane buffer processing of the last object.

The foreground image reading processor 16 reads from the memory apparatus 11 the image (below called "foreground image") photographed using a blue screen, etc. If the image file format stored in the memory apparatus is not RGB format, here, first the image file format is converted to RGB format. The conversion method is generally known and its explanation is omitted here. If the foreground image is the same size $x_{max}$ and $y_{max}$ as the image to be generated, it is sent as is to the RGBZ conversion processor 18, and if not, here processing to adjust it to $x_{max}$ and $y_{max}$ is carried out. The processing at this time is generally known and its explanation is omitted here.

The matte area extraction processor 17 extracts the matte area from the foreground image which was read. The processing at this time is generally known and its explanation is omitted here. An general example of this processing is that the threshold values $R_{min}$, $R_{max}$, $G_{min}$, $G_{max}$, $B_{min}$, and $B_{max}$ are given by the user for each of R, G, and B, and image pixels included in this range of all R, G, and B from the foreground are matte processed by being treated as the matte area.

The RGBZ conversion processor 18 writes into the Z buffer 3, which was explained in the first embodiment, the foreground image which is read from the memory apparatus 11 and which has been converted to size $x_{max}$ and $y_{max}$ and whose format is the RGB format. At this time, (R, G, B)=(0, 0, 0) and a Z value of infinity are given for the coordinates of the pixels within the matte area extracted by the matte area extraction processor 17, and for the coordinates of the other areas, the R, G, and B values are given the Z values given by the user as is, and are written into the Z buffer 3. This is shown in FIG. 15.

After finishing, subsequent defocusing processing is the same processing as that which is carried out for the object described in the first embodiment.

[Fourth Embodiment]

Figure 16:
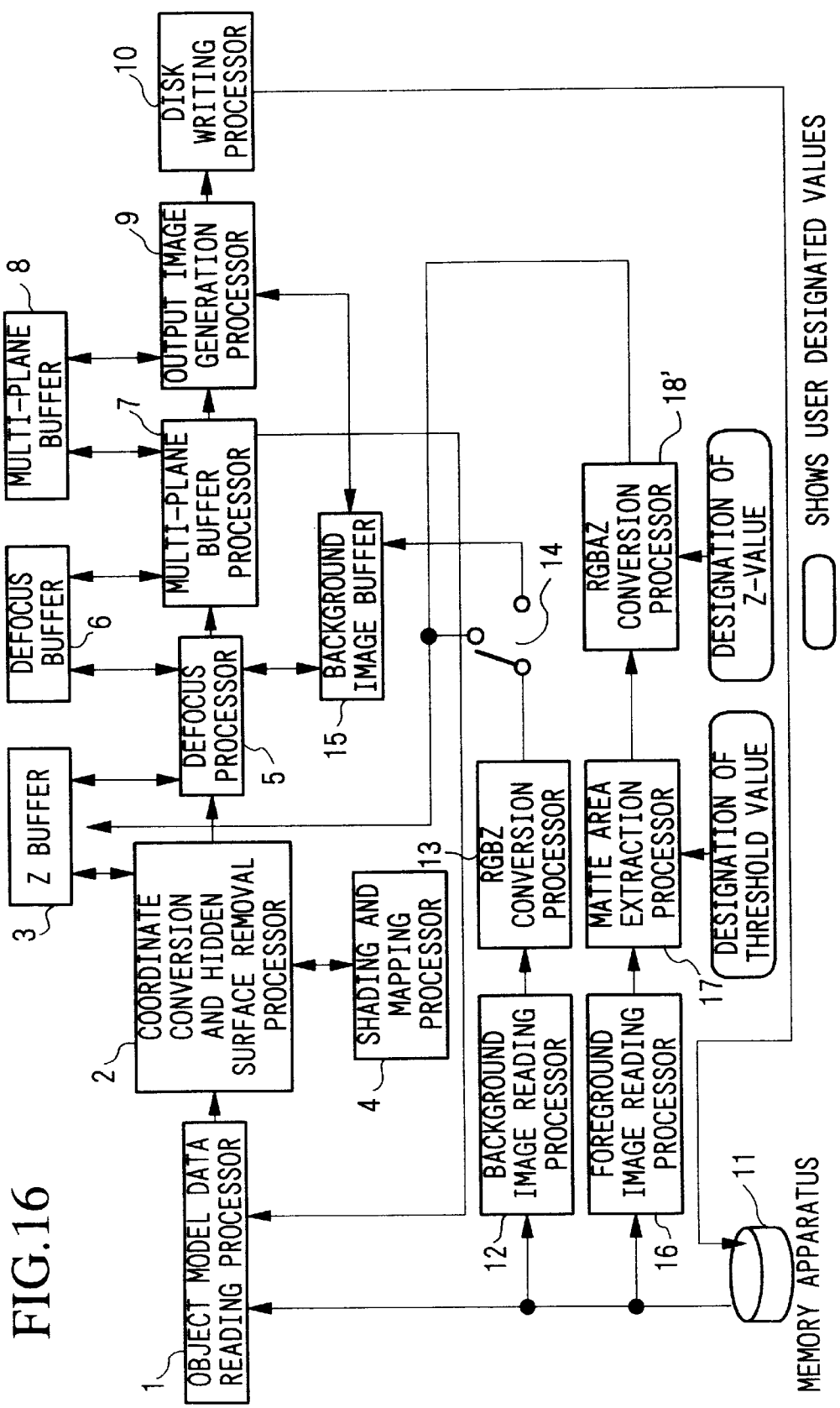
FIG. 16 is a structural diagram of the image generating apparatus of the fourth embodiment of the present invention.

FIG. 16 is a structural diagram of the image generating apparatus of the fourth embodiment of the present invention.

The present embodiment is structured by adding a foreground image reading processor 16, a matte area extraction processor 17, and an RGBAZ conversion processor 18' to the second embodiment (FIG. 12).

The fourth embodiment can be executed before the object model data reading processing of the first object as in the second embodiment, or can carry out processing of the next object after finishing the multi-plane buffer processing of a certain object at an arbitrary timing between the beginning and end of the object model data reading, or can execute before the output image generation processing following the end of the multi-plane buffer processing of the last object.

The foreground image reading processor 16 reads from the memory apparatus 11 the image (below called "foreground image") photographed using a blue screen, etc. If the image file format stored in the memory apparatus is not RGB format, the image file format is first converted to RGB format. The conversion method is generally known and its explanation is omitted here. If the foreground image is the same size $x_{max}$ and $y_{max}$ as the image to be generated, it is sent as is to the RGBAZ conversion processor 18', and if not, here processing to adjust it to $x_{max}$ and $y_{max}$ is carried out. The processing at this time is generally known and its explanation is omitted here.

The matte area extraction processor 17 extracts the matte area from the foreground image which was read, and calculates the value of A. Here, the matte area extraction processor 17 in the matte area is 0 and other than the matte area is 1, and in the the border area with the area other than the matte area adjacent to the matte area, a continuously changing A value is calculated. Moreover, because the extraction of the matte area and the processing of the calculation of the A value are the same as generally known processing, their detailed explanation is omitted here. A brief example of this matte area extraction processing is one in which each of the threshold values $R_{min}$, $R_{max}$, $G_{min}$, $G_{max}$, $B_{min}$, and $B_{max}$ are given by the user for each of R, G, and B, and image pixels included in this range of all R, G, and B from the foreground are matte processed by being treated as the matte area.

The RGBAZ conversion processor 18' writes the foreground image read from the memory apparatus 11 and converted to size $x_{max}$ and $y_{max}$, and whose format is RGBA format into the Z buffer 3 as shown in FIG. 11 described in the explanation of the first embodiment. At this time, (R, G, B, A)=(0, 0, 0, 0) and a Z value of infinity are given for the coordinates of the pixels within the matte area extracted by the matte area extraction processor 17, and for the coordinates of the other areas, the R, G, and B values are given as-is, and the A value calculated by the matte area extraction processor 17 and the Z value given by the user are written into the Z buffer 3 whose construction is shown in FIG. 11. This is shown in FIG. 17.

After finishing, subsequent defocusing processing is the same processing as that which is carried out for the object described in the first embodiment.

[Fifth Embodiment]

The fifth embodiment of the present invention comprises the foreground image reading processor 16, the matte area extraction processor 17, and the RGBZ conversion processor 18 of the third embodiment added to first embodiment (FIG. 1). Its explanation can be simply surmised from the explanations of FIG. 1 and FIG. 14, and is omitted here.

[Sixth Embodiment]

The sixth embodiment of the present invention comprises the foreground image reading processor 16, the matte area extraction processor 17, and the RGBAZ conversion processor 18' of the forth embodiment added to first embodiment (FIG. 1). Its explanation can be simply surmised from the explanations of FIG. 1 and FIG. 14, and is omitted here.

[Seventh Embodiment]

Figure 18:
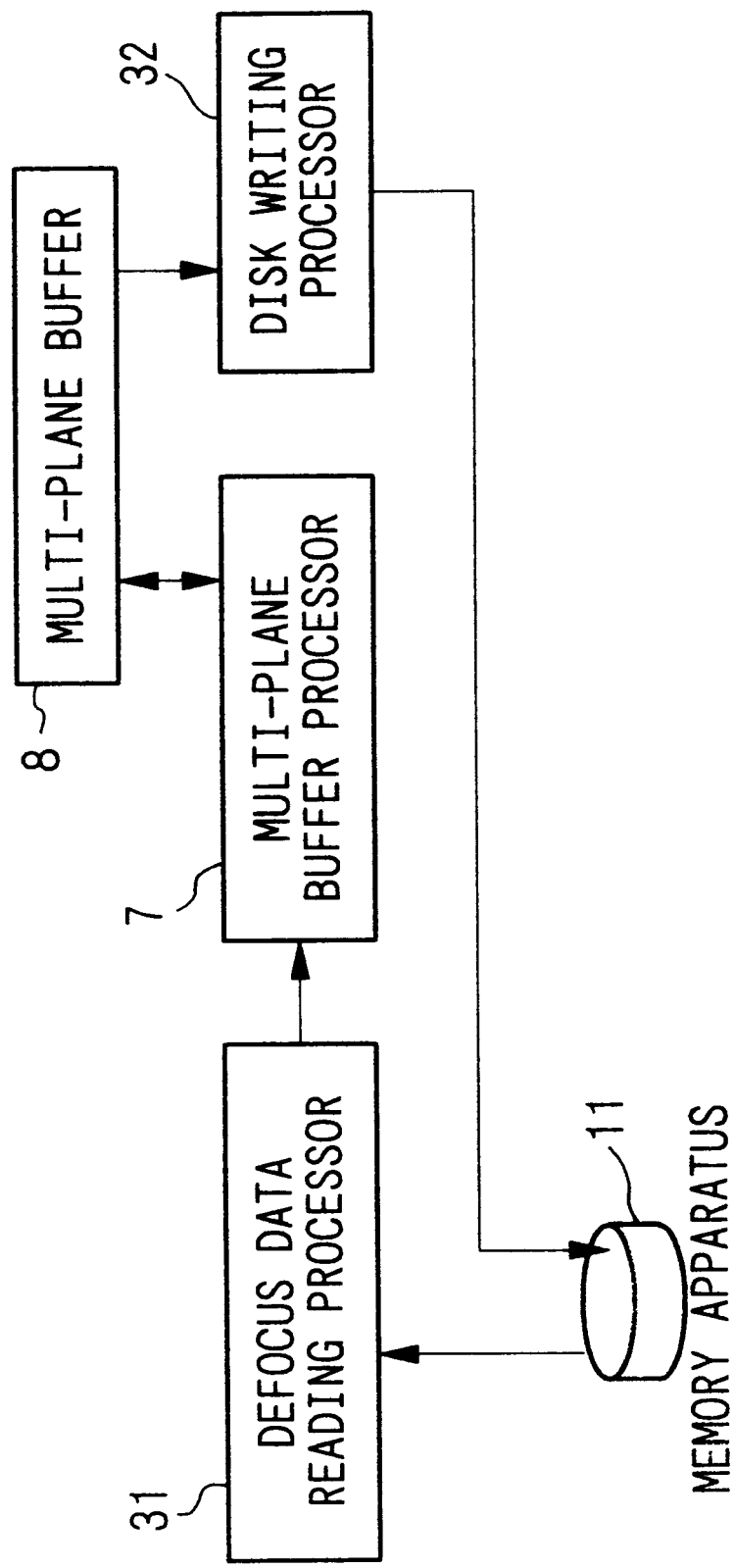
FIG. 18 is a structural diagram of the image generating apparatus of the seventh embodiment of the present invention.

FIG. 18 shows a structural diagram of the image generating apparatus of the seventh embodiment of the present invention.

In FIG. 18, in the memory apparatus 11 is stored a plurality of defocus data which is data consisting of object model data that has been at least coordinate converted, hidden surface processed, and defocus processed, and which assigns R, G, B, and A values to each pixel, this object model data being derived from an object whose positional relationships are to be represented from a vantage point using depth of field, which is the effective focus range within which the object is focused.

The defocus data reading processor 41 reads in sequence the defocus data stored in the memory apparatus 11, and sends it to the multi-plane buffer processor 7.

The multi-plane buffer processor 7 can record the values of R, G, B, A, and Z as pixel values, and using a multi-plane buffer 8 comprising a plurality of planes, stores the sent defocus data in the multi-plane buffer 8 in sequence starting from the distance closest to the vantage point.

The disk writing processor 32 writes to the memory apparatus the data recorded in the multi-plane buffer 8 after all defocus data which is the object of processing is processed.

In this manner, by using a plurality of defocus data on the multi-plane buffer 7 it is possible to generate at high speed an image having a natural depth of field in which the image of a largely defocused physical object in front of the focussed distance appears transparent from the edge at the same time it is defocused.

Moreover, in FIG. 18, the same reference numerals are attached to the parts which correspond to each part of FIG. 1.

What is here called an "object" can include the background images generated by pan-focus and have a Z value of infinity. In addition, "object" can include the foreground image, in which, using a natural image, the matte area not used in image compositing is extracted with a threshold value given by the user, this extracted matte area is given an infinite Z value and 0 for the values of R, G, and B, and for the area other than this, the R, G, and B values are as-is, while the Z value is given by the user.

In FIG. 18, the operation of the multi-plane processor 8 is as explained in the first embodiment.

That is, when the number of planes in the multi-plane buffer 8 is n, the Z value $Z_d (X, Y)$ of the pixel position (X, Y) in the defocus data is compared to the Z value $Z_m (X, Y)_{\#n}$ of the pixel position corresponding the multi-plane buffer 8 of the $n^{th}$ plane.

If $Z_d (X, Y) \leq Z_m (X, Y)_{\#m}$, the Z values from $Z_m (X, Y)_{\#1}$ to $Z_m (X, Y)_{\#n}$ of the image corresponding to each plane of the multi-plane buffer 8 are compared, and the Z value of the pixel position corresponding to the $N^{th}$ plane satisfying $Z_d (X, Y) \leq Z_m (X, Y)_{\#N}$ is calculated.

When the Z value of the pixel position corresponding to the $N^{th}$ plane satisfying the condition has been calculated, the pixel value of the pixels corresponding to the Nth plane and higher in the multi-plane buffer 8 are each shifted back by one plane each to the pixel corresponding to the plane behind it, and the pixel value of the defocus data is made the pixel value of the $N^{th}$ multi-plane buffer 8.

In this manner, processing is carried out wherein a plurality of defocus data is stored in a multi-plane buffer 8 in sequence from the closest distance in the line of sight.

Moreover, the multi-plane buffer 8 is furnished with the necessary minimum number of planes at the first stage, and when the multi-plane buffer processor 7 carries out processing to store in said multi-plane buffer a plurality of defocus data in sequence from the closest distance in the line of sight, every time the number of planes of the multi-plane buffer 8 is exhausted, the necessary planes can be newly allocated.

In addition, in the image generating apparatus of FIG. 18, the defocus buffer 6 and the defocus processor 5 explained in FIG. 1 can be provided. Moreover, in this situation, in the memory apparatus 11, the shading processing data, which was generated by coordinate conversion, hidden surface processing and shading on the object model data, having the values of R, G, B, and Z as pixel values are recorded, and processing is carried out on them by the apparatus. The multi-plane buffer processor 7 processes the data stored in the defocus buffer 6 as defocus data.

In addition, the coordinate conversion and hidden surface removal processor 2 explained in FIG. 1, a Z buffer, and as necessary, a shading and mapping processor 4 can be provided. In this situation, the data which becomes the object of processing recorded in the memory apparatus 11 is exactly the same as that explained in the first embodiment.

In addition, the image generating apparatus of FIG. 18 can further be provided with a processor for processing the background image and foreground image explained in the second embodiment to the sixth embodiment.

[Eighth Embodiment]

Figure 19:
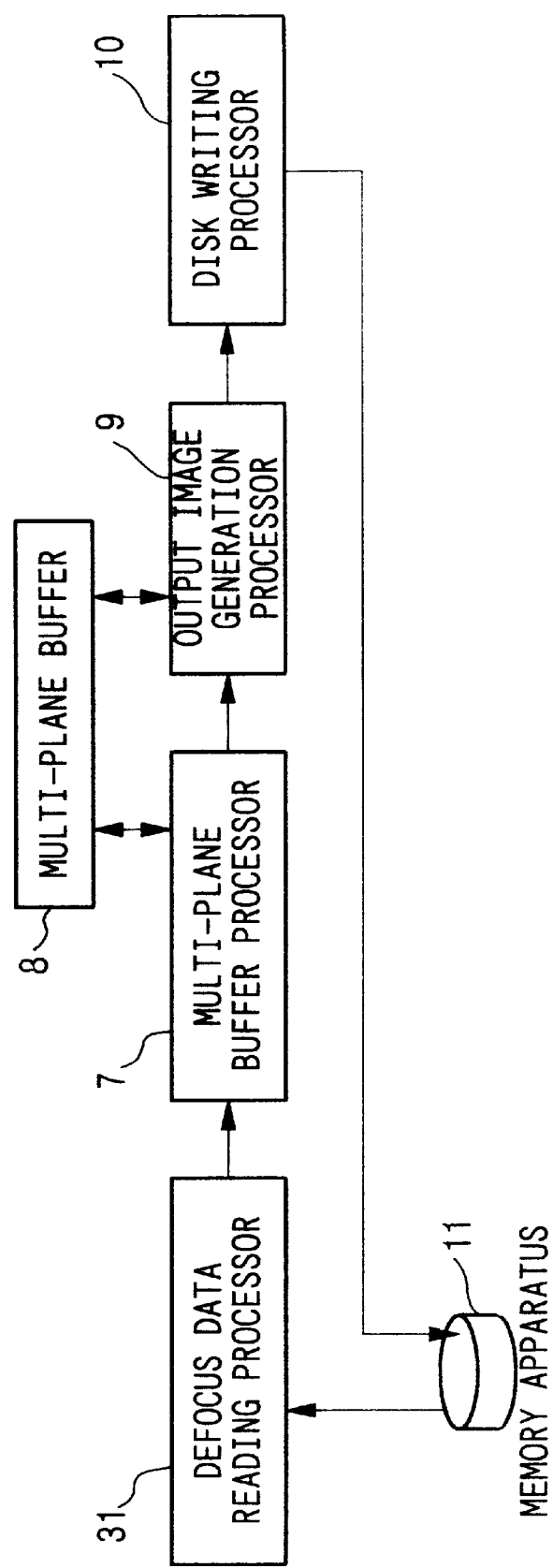
FIG. 19 is a structural diagram of the image generating apparatus of the eighth embodiment of the present invention.

FIG. 19 is a structural diagram of the image generating apparatus of the eighth embodiment of the present invention.

The image generating apparatus of the present embodiment differs from that in FIG. 18 in that it has added to it the output image generation processor 9, and the disk writing processor 10 explained in the first embodiment is used instead of the disk writing processor 32 of FIG. 18. Here, in FIG. 19 the reference numerals added are identical to each corresponding part in FIG. 18.

Moreover, the output image generation processor 9 and the disk writing processor 10 are the same as those explained in the first embodiment, so their explanation is omitted here.

In this manner, from a plurality of defocus data, the image of a largely defocused object which is in front of the focussed distance appears with transparent edges at the same time it is defocused, making possible the generation at high speed of an image having a natural depth of field.

[Ninth Embodiment]

Figure 20:
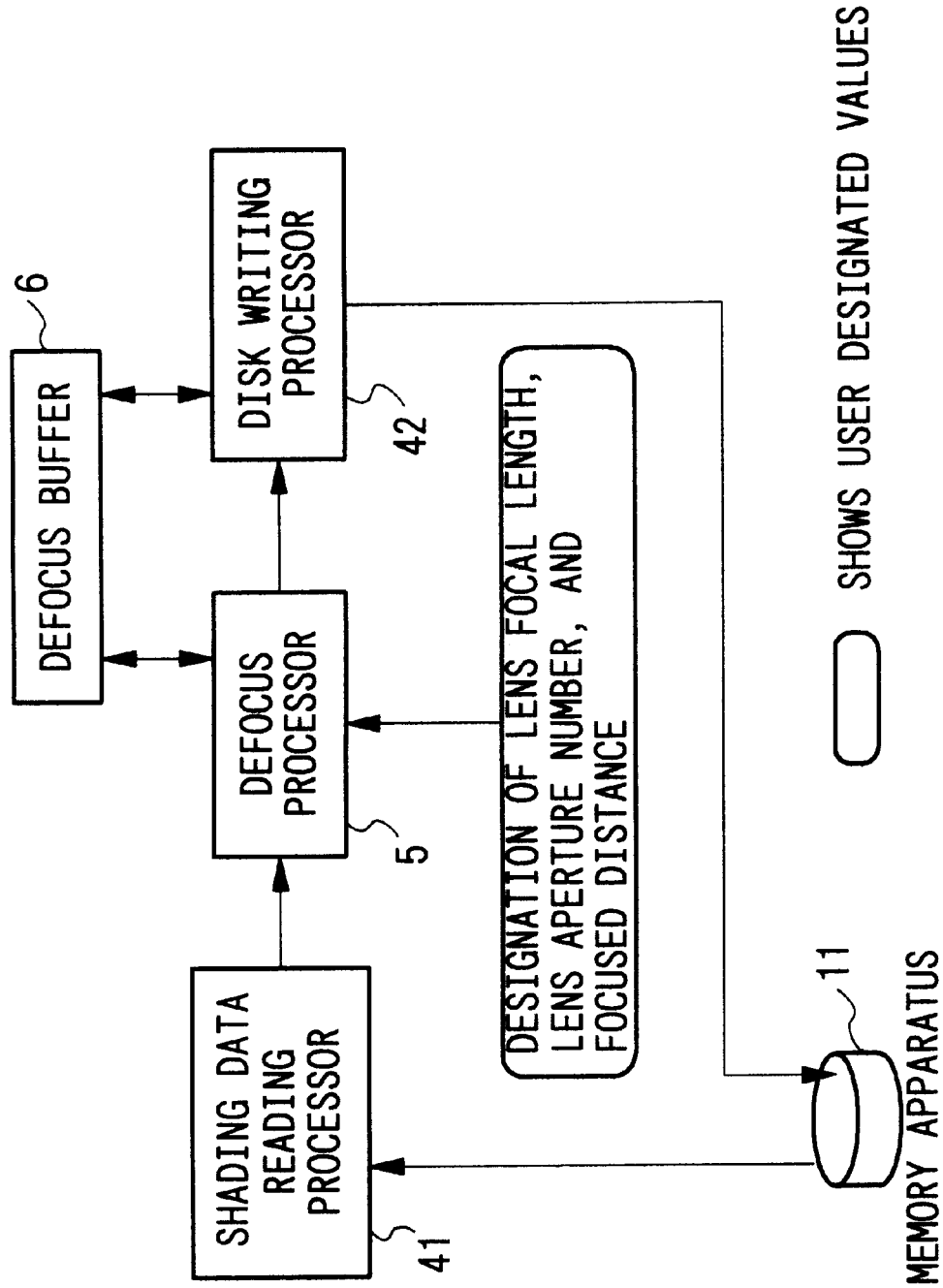
FIG. 20 is a structural diagram of the image generating apparatus of the ninth embodiment of the present invention.

FIG. 20 is a structural diagram of the image generating apparatus of the ninth embodiment of the present invention.

In the image generating apparatus of FIG. 20, in the memory apparatus 11,the shading data which was generated by coordinate conversion and hidden surface processing and shading processing of the object model data having the R, G, B, and Z values which are pixel values, is stored.

In addition, the shading data reading processor 41 reads the shading data which is the object of processing from the memory apparatus 11, and sends it to the defocus processor 5.

The defocus processor 5, using the defocus buffer 6, generates from the sent shading data a defocused image according to a function comprising the focal length of the lens, the aperture number, and distance to the photographed subject, which are the same as those of an actual camera.

The disk writing processor 42 writes the defocused image generated in the defocus buffer 6 into the memory apparatus 11.

In the above manner, a defocused image can be generated.

Moreover, in FIG. 19, the reference numerals added are identical to each corresponding part in FIG. 1.

The defocus processor 6 is the same as that explained in the first embodiment, but we will review its operation below.

The sent shading data is scanned. Then, the circle of confusion of diameter φ of the relevant point light source when defocused is calculated. The intensity ratio of the point light image inside the circle of confusion of diameter φ is calculated, and the coefficient of the intensity ratio M such that the sum of the intensity ratios in the circle of confusion of diameter φ equals 1.0 is calculated. In addition, using the coefficient of intensity M, the values of R, G, and B and the alpha value A inside the circle of confusion of diameter φ are calculated, and added to the values stored in the defocus buffer 6. At this time, the Z value in the pixel position (a, b) in the above circle of confusion of diameter φ in the defocus buffer and the Z value in the same pixel position (X, Y) of the shading data are compared, and if the Z value in the shading data is smaller, the Z value in the pixel position (X, Y) in the shading data is moved to the Z value in the pixel position (a, b) in the circle of confusion of diameter φ in the defocus buffer 6.

In this manner, the defocused image is generated.

Moreover, the defocus processor 5 can make quick calculations by calculating the intensity ratio of the point light image in the circle of confusion of diameter φ by a approximate equation using cosines.

[Tenth Embodiment]

FIG. 21 is a structural diagram of the image generating apparatus of the tenth embodiment of the present invention.

The image generating apparatus of the present embodiment differs from that in FIG. 20 in that the coordinate conversion and hidden surface removal processor 2, a Z buffer 3, and as necessary a shading and mapping processor 4 are added. A model data reading processor is corresponding to the object model data reading processor 1 shown in FIG. 1. Here, in FIG. 21 the reference numerals added are identical to each corresponding part in FIG. 20, and its explanation is omitted.

Moreover, the coordinate conversion and hidden surface removal processor 2, the Z buffer 3, and the shading and mapping processor 4 are the same as those in the first embodiment, and their explanation is omitted here.

Moreover, the image generated by the image generation processor described in the first through tenth embodiments was explained as being stored in a memory apparatus 11, but it is not limited to this. For example, it could be sequentially displayed in a display apparatus.

In addition, even if the functions of each processor explained in the first through tenth embodiments are realized as functions on dedicated hardware, these functions can be provided by a program and realized by execution by a CPU (Central Processing Unit) using memory not shown in the image generating apparatus.

Moreover, the sequence shown in FIGS. 1, 7, 10, 12, 14, 16, 18, 19, 20, and 21 are executed by a program on a computer system, and the relevant program can be provided recorded on a computer readable recording medium such as a floppy disk, CD-ROM, ROM tape, etc., and the image generated. Moreover, here the meaning of "computer system" includes the OS and peripheral hardware. In addition, the meaning of "computer readable recording medium" includes temporary dynamic program storage such as communication lines when a program is transmitted via communication lines such as a network, for example, the internet or telephone lines, and RAM in the computer system of the server or client which stores the program temporarily. In addition, the above-described program can realize one part of the above-described functions, and furthermore, the above-described functions can be realized by combining programs already stored in a computer system.

As explained above, the present invention has the following effects:

In the same manner as an actual camera, the present invention can quickly generate in image having a photograph-like natural depth of field, and also treat transparent and semi-transparent objects.

In addition, the present invention can use a photographic image, for example, generated separately beforehand as background in a composite naturally from the point of view of the depth of field, and also treat transparent and semi-transparent objects.

Additionally, by giving an A value, for example, a natural image of a human photographed with a blue back can be naturally composited from the point of view of the depth of field, and also treat transparent and semi-transparent objects.

What is claimed is:

1. An image generating apparatus comprising:
   a multi-plane buffer comprising a plurality of planes, and can record R, G, B, A and Z values as pixels, and
   a multi-plane buffer processor which stores in said multi-plane buffer in sequence from closest distance from a vantage point a plurality of defocus data which is data consisting of object model data that has been at least coordinate converted, hidden surface processed, and defocus processed, and which assigns R, G, B, A and Z values to each pixel, this object model data being derived from an object whose positional relationships are to be represented from a vantage point using depth of field, which is the effective focus range within which the object is focused.

2. An image generating apparatus according to claim 1 wherein said image generating apparatus is further provided with an output image processor which generates the final image from the contents of said multi-plane buffer after processing by the multi-plane processor on all defocus data has finished.

3. An image generating apparatus according to claim 1 wherein a plurality of said defocus data is processed in a sequence closest in distance from the vantage point and stored in said multi-plane buffer by said multi-plane buffer processing including:
   comparing the Z value $Z_d(X, Y)$ in the pixel position (X, Y) in the defocus data with the Z value $Z_m(X, Y)_{\#n}$ of the pixel position corresponding to $n^{th}$ plane of the multi-plane buffer, where n is the plane number of said multi-plane buffers, and if the former is smaller, $Z_d(X, Y)$ is sequentially compared with the Z values from $Z_m(X, Y)_{\#1}$ to $Z_m(X, Y)_{\#n}$ of the pixels corresponding to each plane of said multi-plane buffer, and when a Z value of a pixel position corresponding to the $N^{th}$ multi-plane buffer satisfying $Z_d(X, Y) < Z_m(X, Y)_{\#N}$ is found, the pixel value of the pixels corresponding to the multi-plane buffer after the $N^{th}$ plane is shifted to the pixel corresponding to the plane one plane behind, and the pixel value of said defocus data is made the pixel value of the $N^{th}$ plane of said multi-plane buffer.

4. An image generating apparatus according to claim 1 wherein:
   said multi-plane buffer is provided at the beginning stage with the minimum number of necessary planes, and
   said multi-plane buffer processor allocates newly necessary planes for said multi-plane buffer each time the number of planes of said multi-plane buffer are exhausted when carrying out processing in which said plurality of defocus data is stored in sequence from the distance closest from the vantage point in said multi-plane buffer.

5. An image generating apparatus according to claim 2 the apparatus is further provided with:
   a defocus buffer that can store the R, G, B, A, and Z values as pixel values, and
   a defocus processor which generates a defocus image according to a function comprising the focal length of the lens, aperture number, and distance to the photographed subject which are identical to an actual camera, from shading data having R, G, B, and Z values as pixel values, which was generated by coordinate conversion and shading for said object model data, and stores them in said defocus buffer, and
   said multi-plane processor buffer processes the data stored in said defocus buffer as said defocus data.

6. An image generating apparatus according to claim 2 wherein said image generating apparatus is further provided with:
   a defocus buffer that can store the R, G, B, A, and Z values as pixel values, and
   a defocus processor which generates a defocus image according to a function comprising the focal length of the lens, aperture number, and distance to the photographed subject which are identical to an actual camera, from shading data having R, G, B, and Z values as pixel values, which was generated by coordinate conversion and shading for said object model data, and stores them in said defocus buffer, and said multi-plane processor buffer processes the data stored in said defocus buffer as said defocus data.

7. An image generating apparatus according to claim 5 which generates a defocus image by:

scanning said shading data, calculating the circle of confusion of diameter $\phi$ of the defocused point light source image, calculating the intensity ratio of the point light source image in said circle of confusion diameter $\phi$, calculating the coefficient ratio of intensity M such that the sum of the intensity ratios in said circle of confusion of diameter $\phi$ is 1.0, calculating the values of R, G, and B and the alpha value A in said circle of confusion of diameter $\phi$ by using said coefficient ratio of intensity, and adding them to the values stored in said defocus buffer, comparing the Z value in the pixel position (a, b) in said circle of confusion of diameter $\phi$ in said defocus buffer with the Z value in the same pixel position (X, Y) in said shading data, and if the Z value in said shading data is smaller, moving the Z value in the pixel position (X, Y) of said shading data to the Z value in the pixel position (a, b) in said circle of confusion of diameter $\phi$ in said defocus buffer.

8. An image generating apparatus according to claim 7 wherein:

said defocus processor calculates intensity ratio of the point light source image in said circle of confusion of diameter $\phi$ by an approximate calculating using cosines.

9. An image generating apparatus according to claim 5 wherein the apparatus is further provided with:

a Z buffer which can store the values of R, G, B, and Z as pixel values, and a coordinate conversion and hidden surface removal processor which carries out coordinate conversion, hidden surface processing, and shading on said object model data, and stored the result in said Z buffer, and wherein said defocus processor processes the data stored in said Z buffer as said shading data.

10. An image generating apparatus according to claim 6 wherein said image generating apparatus is further provided with:

a Z buffer which can store the values of R, G, B, A and Z as pixel values, and a coordinate conversion and hidden surface removal processor which carries out coordinate conversion, hidden surface processing, and shading on said object model data, and stored the result in said Z buffer, and wherein said defocus processor processes the data stored in said Z buffer as said shading data.

11. An image generating apparatus according to claim 1 wherein:

said object is generated by pan-focus, and includes the background image given a Z value at infinity.

12. An image generating apparatus according to claim 1 wherein:

said object includes a foreground image wherein, using a natural image, the matte area which is the area not used when image compositing is extracted with a threshold value given by the user, which is given an infinite Z value and R, G, and B values of 0 each as color information in extracted matte area, and for the area other than this area, given the R, G, and B values as-is, and the Z value given by the user.

13. An image generating apparatus according to claim 9 wherein the apparatus is further provided with:

a background image buffer which can store values of R, G, B, and Z as pixel values, and which carries out RGBZ conversion processing by giving infinity as the Z value to a background image, and when said background image is generated with the same photographic parameters as the object, writes the result of said RGBZ conversion processing into said background image buffer, and when said background image is generated by pan-focus, writes the result of said RGBZ conversion processing which said Z buffer, and then writes the data which was defocus processed by said defocus processor into said background image buffer, and wherein said output image generation processor reads values of said background image buffer and said multi-plane buffer, and generates and outputs an image.

14. An image generating apparatus according to claim 10 wherein the apparatus is further provided with:

a background image buffer which can store values of R, G, B, and Z as pixel values, and which carries out RGBZ conversion processing by giving infinity as the Z value to a background image, and when said background image is generated with the same photographic parameters as the object, writes the result of said RGBZ conversion processing into said background image buffer, and when said background image is generated by pan-focus, writes the result of said RGBZ conversion processing which said Z buffer, and then writes the data which was defocus processed by said defocus processor into said background image buffer, and wherein said output image generation processor reads values of said background image buffer and said multi-plane buffer, and generates and outputs an image.

15. An image generating apparatus according to claim 9 wherein the apparatus is further provided with:

a matte area processor which extracts from a natural image a matte area which is the area not used when compositing using a threshold value given by a user, and a RGBZ conversion processor which gives a Z value of infinity and gives each of the R, G, and B the value 0 as color information to the extracted matte area, and for the area other than this, gives R, G, and B values as-is and gives a Z value given by the user.

16. An image generating apparatus according to claim 10 further provided with:

a matte area processor which extracts from a natural image a matte area which is the area not used when compositing using a threshold value given by a user, calculates a continuously changing A in at the other borders adjacent to said extracted area, and a RGBZ conversion processor which gives a Z value of infinity and gives each of the R, G, and B the value 0 as color information to the extracted matte area, and for the area other than this, gives R, G, and B values as-is, gives said calculated A value and the Z value given by the user.

17. An image generating apparatus comprising:

a defocus buffer which can store the values of R, G, B, A, and Z as pixel values, and a defocus processor which generates a defocus image by using said defocus buffer according to a function comprising the focal length of the lens, aperture number, and distance to the photographed subject are the same as an actual camera, from the shading data, which is generated by coordinate conversion, hidden surface processing, and shading for the model data of the object, having a value of R, G, B, and Z as a pixels, wherein said defocus processing unit generates the defocus image by:

scanning said shading data, calculating the circle of confusion of diameter $\phi$ of defocused point light source image, calculating the intensity ratio of the point light source image in said circle of confusion of diameter $\phi$, calculating the coefficient ratio of intensity M such that the sum of the intensity ratios in the circle of confusion of diameter $\phi$ is 1.0, calculating the R, G, and B values and alpha value A in said circle of confusion of diameter $\phi$ by using said coefficient ratio of intensity M, and adding it to the values stored in said defocus buffer, and comparing the Z value in the pixel position (a, b) in said circle of confusion of diameter $\phi$ in said defocus buffer with the Z value in the pixel position (X, Y) in said shading data, and if the Z value of said shading data is smaller, moving the Z value of the pixel position (X, Y) of said shading data is moved to the Z value in the pixel position (a, b) in said circle of confusion of diameter $\phi$ in said defocus buffer.

18. An image generating apparatus according to claim 17 wherein:

said defocus processor calculates the intensity ratio of the point of light source image in said circle of confusion of diameter $\phi$ by an approximate calculation using cosines.

19. An image generating apparatus comprising:

a defocus buffer which can store the values of R, G, B, A, and Z as pixel values, and a defocus processor which generates a defocus image by using said defocus buffer according to a function comprising the focal length of the lens, aperture number, and distance to the photographed subject are the same as an actual camera, from the shading data, which is generated by coordinate conversion, hidden surface processing, and shading for the model data of the object, having a value of R, G, B, and Z as a pixels.

wherein the apparatus is further provided with:

a Z buffer that can store the R, G, B, and Z values as pixel data, and a coordinate conversion and hidden surface removal processor which carried out coordinate conversion, hidden surface processing, and shading of said object model data, and stores the result in said Z buffer, and wherein said defocus processor processes the data stored in said Z buffer as said shading data.

20. An image generating method which includes the steps of:

obtaining a plurality of defocus data which is data consisting of object model data that has been at least coordinate converted, hidden surface processed, and defocus processed, and which assigns R, G, B, A and Z values to each pixel, this object model data being derived from an object whose positional relationships are to be represented from a vantage point using depth of field, which is the effective focus range within which the object is focused, and multi-plane buffer processing, wherein said obtained defocus data are stored in a multi-plane buffer comprising a plurality of planes, and can record RGBAZ values as pixels, in sequence from the closest distance from the vantage point.

21. An image generating method according to claim 12 wherein said image generating apparatus further includes the step of output image generation processing, wherein the finished image is generated from the contents of said multi-plane buffer after the multi-plane buffer processing is finished from all defocus data, and output.

22. An image generating method according to claim 20 wherein a plurality of said defocus data is processed in a sequence closest in distance from the vantage point and stored in said multi-plane buffer by said multi-plane buffer processing steps including:

comparing the Z value $Z_d(X, Y)$ in the pixel position (X, Y) in the defocus data with the Z value $Z_m(X, Y)_{\#n}$ of the pixel position corresponding to $n^{th}$ plane of the multi-plane buffer, where n is the plane number of said multi-plane buffers, and if the former is smaller, $Z_d(X, Y)$ is sequentially compared with the Z values from $Z_m(X, Y)_{\#1}$ to $Z_n(X, Y)_{\#n}$ of the pixels corresponding to each plane of said multi-plane buffer, and when a Z value of a pixel position corresponding to the $N^{th}$ multi-plane buffer satisfying $Z_d(X, Y) < Z_m(X, Y)_{\#N}$ is found, the pixel value of the pixels corresponding to the multi-plane buffer after the $N^{th}$ plane is shifted to the pixel corresponding to the plane one plane behind, and the pixel value of said defocus data is made the pixel value of the $n^{th}$ plane of said multi-plane buffer.

23. An image generating method according to claim 20 wherein:

said multi-plane buffer is provided at the beginning stage with the minimum number of necessary planes, and said multi-plane buffer processor allocates newly necessary planes for said multi-plane buffer each time the number of planes of said multi-plane buffer are exhausted when carrying out processing in which said plurality of defocus data is stored in sequence from the distance closest from the vantage point in said multi-plane buffer.

24. An image generating method according to claim 21 wherein said step which obtains said defocus data, in order to obtain said defocus data, includes a defocus processing step wherein:

a defocus image is generated according to a function comprising the focal length of the lens, aperture number, and distance from the photographed subject which are the same as an actual camera from the shading data which is generated by the coordinate conversion, hidden surface processing, and shading from said object model data, having the values of R, G, B, and Z as pixel values.

25. An image generating method according to claim 21 which further includes a defocus processing step wherein:

a defocus image is generated according to a function comprising the focal length of the lens, aperture number, and distance from the photographed subject which are the same as an actual camera from the shading data, which is generated by the coordinate conversion, hidden surface processing, and shading from said object model data, having which has the values of R, G, B, and Z as pixel values.

26. An image generating method according to claim 24 wherein a defocus image is generated by:

scanning said shading data, calculating the circle of confusion of diameter φ of the defocused point light source image, calculating the intensity ratio of the point light source image in said circle of confusion of diameter φ, calculating the coefficient ratio of intensity M such that the sum of the intensity ratios of said circle of confusion of diameter φ is 1.0, calculating the values of R, G, and B and the alpha value A in said circle of confusion of diameter φ by using said coefficient ratio of intensity, and adding them to the values stored in said defocus buffer, comparing the Z value in the pixel position (a, b) in said circle of confusion of diameter φ in said defocus buffer with the Z value in the same pixel position (X, Y) in said shading data, and if the Z value in said shading data is smaller, moving the Z value in the pixel position (X, Y) of said shading data to the Z value in the pixel position (a, b) in said circle of confusion of diameter φ in said defocus buffer.

27. An image generating method according to claim 17 wherein:

said defocus buffer processor calculates the intensity ratio of the point light source image in said circle of confusion of diameter φ by an approximate calculation using cosines.

28. An image generating method according to claim 24 which further includes the step of carrying out coordinate conversion, hidden surface processing, and shading on said object model data, and storing the results in the Z buffer, and said defocus processor step processing the data stored in said Z buffer as shading data.

29. An image generating method according to claim 25 which further includes the step of:

carrying out coordinate conversion, hidden surface processing, and shading of said object model data, and storing the results in the Z buffer, and said defocus processor step processing the data stored in said Z buffer as shading data.

30. An image generating method according to claim 20 wherein:

said object is generated by pan-focus, and includes a background image given infinity as a Z value.

31. An image generating method according to claim 20 wherein:

said object includes a foreground image wherein, using a natural image, the matte area which is the area not used when image compositing is extracted with a threshold value given by the user, which is given an infinite Z value and R, G, and B values of 0 each as color information in extracted matte area, and for the area other than this area, given the R, G, and B values as-is, and the Z value given by the user.

32. An image generating method according to claim 28 which further includes the steps of:

storing values of R, G, B, and Z as pixel values in a background image buffer, carrying out RGBZ conversion processing by giving infinity as the Z value to a background image, and when said background image is generated with the same photographic parameters as the object, writes the result of said RGBZ conversion processing into said background image buffer, and when said background image is generated by pan-focus, writes the result of said RGBZ conversion processing which said Z buffer, and then writes the data which was defocus processed by said defocus processor into said background image buffer, and wherein said output image generation processor reading values of said background image buffer and said multi-plane buffer, and generates and outputs an image.

33. An image generating method according to claim 29 which further includes the steps of:

storing values of R, G, B, and Z as pixel values in a background image buffer, carrying out RGBZ conversion processing by giving infinity as the Z value to a background image, and when said background image is generated with the same photographic parameters as the object, writes the result of said RGBZ conversion processing into said background image buffer, and when said background image is generated by pan-focus, writes the result of said RGBZ conversion processing which said Z buffer, and then writes the data which was defocus processed by said defocus processor into said background image buffer, and wherein said output image generation processor reading values of said background image buffer and said multi-plane buffer, and generates and outputs an image.

34. An image generating method according to claim 28 further includes the steps of:

matte area processing wherein the matte area which is the area not used when image compositing is extracted from a natural image using a threshold value given by the user, and an RGBZ processing which writes into said Z buffer, and wherein an infinite Z value and R, G, and B values of 0 each as color information in extracted matte area are given, and for the area other than this area, given the R, G, and B values as-is, and the A value and Z value given by the user.

35. An image generation method according to claim 29 which includes the steps of:

a matte area processor which extracts from a natural image a matte area which is the area not used when compositing using a threshold value given by a user, calculates a continuously changing A in at the other borders adjacent to said extracted area, and a RGBZ conversion processor which gives a Z value of infinity and gives each of the R, G, and B the value 0 as color information to the extracted matte area, and for the area other than this, gives R, G, and B values as-is, gives said calculated A value and the Z value given by the user.

36. An image generation method which includes the steps of:

carrying out coordinate conversion and shading on object model data, and obtaining shading data having the values of R, G, B, and Z as pixel values, and generating a defocus image by using a defocus buffer according to a function comprising the focal length of the lens, aperture number, and distance to the photographed subject are the same as an actual camera, from the shading data, which is generated by coordinate conversion, hidden surface processing, and shading for the model data of the object of the defocus processing, having a value of R, G, B, A, and Z as a pixels, wherein the defocus image is generated by said defocus processor by the steps of:

scanning said shading data, calculating the circle of confusion of diameter φ of defocused point light source image, calculating the intensity ratio of the point light source image in said circle of confusion of diameter φ, calculating the coefficient ratio of intensity M such that the sum of the intensity ratios in the said the circle of confusion of diameter is 1.0, calculating the R, G, and B values and alpha value A in said circle of confusion of diameter φ by using said coefficient ratio of intensity M, and adding it to the values stored in said defocus buffer, and comparing the Z value in the pixel position (a, b) in said circle of confusion of diameter φ in said defocus buffer with the Z value in the pixel position (X, Y) in said shading data, and if the Z value of said shading data is smaller, moving the Z value of the pixel position (X, Y) of said shading data is moved to the Z value in the pixel position (a, b) in said circle of confusion of diameter φ in said defocus buffer.

37. An image generating method according to claim 36 wherein said defocus processing consists of the step of:

calculating by an approximate calculation using cosines the intensity ratio of the point light source image in said circle of confusion of diameter φ.

38. An image generation method which includes the step of:

carrying out coordinate conversion and shading on object model data, and obtaining shading data having the values of R, G, B, and Z as pixel values, generating a defocus image by using a defocus buffer according to a function comprising the focal length of the lens, aperture number, and distance to the photographed subject are the same as an actual camera, from the shading data, which is generated by coordinate conversion, hidden surface processing, and shading for the model data of the object of the defocus processing, having a value of R, G, B, A, and Z as a pixels, coordinate conversion and hidden surface removal wherein coordinate conversion, hidden surface processing, and shading of said model data are carried out, and result stored in the Z buffer, and further wherein said step of obtaining shading data, and obtains the data stored in said Z buffer as said shading data.

39. A computer readable medium recording an image generating program, the program making the computer execute the steps of:

obtaining a plurality of defocus data which is data consisting of object model data that has been at least coordinate converted, hidden surface processed, and defocus processed, and which assigns R, G, B, A and Z values to each pixel, this object model data being derived from an object whose positional relationships are to be represented from a vantage point using depth of field, which is the effective focus range within which the object is focused, and multi-plane buffer processing, wherein said obtained defocus data are stored in a multi-plane buffer comprising a plurality of planes, and can record RGBAZ values as pixels, in sequence from the closest distance from the vantage point.

40. A recording medium recording an image generating program according to claim 39, the program further makes a computer execute the steps of:

output image generation processing, wherein the finished image is generated from the contents of said multi-plane buffer after the multi-plane buffer processing is finished from all defocus data, and output.

41. A recording medium recording an image generating program according to claim 39 in which carries out processing wherein said plurality of defocus data is stored in said multi-plane buffer in sequence from closest from the vantage point by:

comparing the Z value $Z_d$ (X, Y) in the pixel position (X, Y) in the defocus data with the Z value $Z_m$ (X, Y)$_{\#n}$ of the pixel position corresponding to nth plane of the multi-plane buffer, where n is the plane number of said multi-plane buffers, and if the former is smaller, $Z_d$ (X, Y) is sequentially compared with the Z values from $Z_m$ (X, Y)$_{\#1}$ to $Z_m$ (X, Y)$_{\#n}$ of the pixels corresponding to each plane of said multi-plane buffer, and when a Z value of a pixel position corresponding to the $N^{th}$ multi-plane buffer satisfying $Z_d$ (X, Y)<$Z_m$ (X, Y)$_{\#N}$ is found, the pixel value of the pixels corresponding to the multi-plane buffer after the $N^{th}$ plane is shifted to the pixel corresponding to the plane one plane behind, and the pixel value of said defocus data is made the pixel value of the $n^{th}$ plane of said multi-plane buffer.

42. A recording medium recording an image generating program according to claim 41 wherein:

said multi-plane buffer is provided at the beginning stage with the minimum number of necessary planes, and said multi-plane buffer processor allocates newly necessary planes for said multi-plane buffer each time the number of planes of said multi-plane buffer are exhausted when carrying out processing in which said plurality of defocus data is stored in sequence from the distance closest from the vantage point in said multi-plane buffer.

43. A recording medium recording an image generating program according to claim 40 which further includes said steps of:

a defocus image is generated according to a function comprising the focal length of the lens, aperture number, and distance from the photographed subject which are the same as an actual camera from the shading data which is generated by the coordinate conversion, hidden surface processing, and shading from said object model data, having the values of R, G, B, and Z as pixel values.

44. A recording medium which records an image generating program according to claim 40 further to realize in a computer:

a defocus image is generated according to a function comprising the focal length of the lens, aperture number, and distance from the photographed subject which are the same as an actual camera from the shading data, which is generated by the coordinate conversion, hidden surface processing, and shading from said object model data, having which has the values of R, G, B, and Z as pixel values.

45. A recording medium which records an image generating program according to claim 43 which carries out generation of a defocus image by:

scanning said shading data, calculating the circle of confusion of diameter φ of the defocused point light source image, calculating the intensity ratio of the point light source image in said circle of confusion of diameter φ, calculating the coefficient ratio of intensity M such that the sum of the intensity ratios of said circle of confusion of diameter φ is 1.0, calculating the values of R, G, and B and the alpha value A in said circle of confusion of diameter φ by using said coefficient ratio of intensity, and adding them to the values stored in said defocus buffer, comparing the Z value in the pixel position (a, b) in said circle of confusion of diameter φ in said defocus buffer with the Z value in the same pixel position (X, Y) in said shading data, and if the Z value in said shading data is smaller, moving the Z value in the pixel position (X, Y) of said shading data to the Z value in the pixel position (a, b) in said circle of confusion of diameter φ in said defocus buffer.

46. A recording medium which records an image generating program according to claim 45 wherein:

said defocus buffer processor calculates the intensity ratio of the point light source image in said circle of confusion of diameter φ by an approximate calculation using cosines.

47. A recording medium which records an image generating program according to claim 43 to realize on a computer the further steps of:

carrying out coordinate conversion, hidden surface processing, and shading on said object model data, and storing the results in the Z buffer, and said defocus processor step processing the data stored in said Z buffer as shading data.

48. A recording medium which records an image generating program according to claim 44 to realize on a computer the further steps of:

carrying out coordinate conversion, hidden surface processing, and shading of said object model data, and storing the results in the Z buffer, and said defocus processor step processing the data stored in said Z buffer as shading data.

49. A recording medium which records an image generating program according to claim 39 wherein:

said object is generated by pan-focus, and includes a background image given infinity as a Z value.

50. A recording medium which records an image generating program according to claim 39 wherein:

said object includes a foreground image wherein, using a natural image, the matte area which is the area not used when image compositing is extracted with a threshold value given by the user, which is given an infinite Z value and R, G, and B values of 0 each as color information in extracted matte area, and for the area other than this area, given the R, G, and B values as-is, and the Z value given by the user.

51. A recording medium which records an image generating program according to claim 47 to realize on a computer the further steps of:

carrying out RGBZ conversion processing by giving infinity as the Z value to a background image, and when said background image is generated with the same photographic parameters as the object, writes the result of said RGBZ conversion processing into said background image buffer, and when said background image is generated by pan-focus, writes the result of said RGBZ conversion processing which said Z buffer, and then writes the data which was defocus processed by said defocus processor into said background image buffer, and wherein said output image generation processor reading values of said background image buffer and said multi-plane buffer, and generates and outputs an image.

52. A recording medium which records an image generating program according to claim 48 to realize on a computer the further steps of:

storing values of R, G, B, and Z as pixel values in a background image buffer, carrying out RGBZ conversion processing by giving infinity as the Z value to a background image, and when said background image is generated with the same photographic parameters as the object, writes the result of said RGBZ conversion processing into said background image buffer, and when said background image is generated by pan-focus, writes the result of said RGBZ conversion processing which said Z buffer, and then writes the data which was defocus processed by said defocus processor into said background image buffer, and wherein said output image generation processor reading values of said background image buffer and said multi-plane buffer, and generates and outputs an image.

53. A recording medium which records an image generating program according to claim 47 to realize on a computer the further steps of:

matte area processing wherein the matte area which is the area not used when image compositing is extracted from a natural image using a threshold value given by the user, and an RGBZ processing which writes into said Z buffer, and wherein an infinite Z value and R, G, and B values of 0 each as color information in extracted matte area are given, and for the area other than this area, given the R, G, and B values as-is, and the A value and Z value given by the user.

54. A recording medium which records an image generating program according to claim 48 to realize on a computer the further steps of:

a matte area processor which extracts from a natural image a matte area which is the area not used when compositing using a threshold value given by a user, calculates a continuously changing A in at the other borders adjacent to said extracted area, and a RGBZ conversion processor which gives a Z value of infinity and gives each of the R, G, and B the value 0 as color information to the extracted matte area, and for the area other than this, gives R, G, and B values as-is, gives said calculated A value and the Z value given by the user.

55. A computer-readable recording medium which has recorded an image generating program to realize on a computer generating a defocus image by:

carrying out coordinate conversion and shading on object model data, and obtaining shading data having the values of R, G, B, and Z as pixel values, generating a defocus image by using a defocus buffer according to a function comprising the focal length of lens, aperture number, and distance to the photographed subject are the same as an actual camera, from the shading data, which is generated by coordinate conversion, hidden surface processing, and shading for the model data of the object of the defocus processing, having a value of R, G, B, A, and Z as a pixels, scanning said shading data, calculating the circle of confusion of diameter $\phi$ of defocused point light source image, calculating the intensity ratio of the point light source image in the said circle of confusion of diameter $\phi$, calculating the coefficient ratio of intensity M such that the sum of the intensity ratios in the said circle of confusion of diameter $\phi$ is 1.0, calculating the R, G, and B values and alpha value A in said circle of confusion of diameter $\phi$ by using said coefficient ratio of intensity M, and adding it to the values stored in said defocus buffer, and comparing the Z value in the pixel position (a, b) in said circle of confusion of diameter $\phi$ in said defocus buffer with the Z value in the pixel position (X, Y) in said shading data, and if the Z value of said shading data is smaller, moving the Z value of the pixel position (X, Y) of said shading data is moved to the Z value in the pixel position (a, b) in said circle of confusion of diameter $\phi$ in said defocus buffer.

56. A recording medium which records an image generating program according to claim 55 wherein:

calculating by an approximate calculation using cosines the intensity ratio of the point light source image in said circle of confusion of diameter $\phi$.

57. A computer-readable recording medium which has recorded an image generating program to realize on a computer:

carrying out coordinate conversion and shading on object model data, and obtaining shading data having the values of R, G, B, and Z as pixel values, generating a defocus image by using a defocus buffer according to a function comprising the focal length of lens, aperture number, and distance to the photographed subject are the same as an actual camera, from the shading data, which is generated by coordinate conversion, hidden surface processing, and shading for the model data of the object of the defocus processing, having a value of R, G, B, A, and Z as a pixels, coordinate conversion and hidden surface removal wherein coordinate conversion, hidden surface processing, and shading of said model data are carried out, and result stored in the Z buffer, and further wherein said step of obtaining shading data, and obtains the data stored in said Z buffer as said shading data.

* * * * *

UNITED STATES PATENT AND TRADEMARK OFFICE
CERTIFICATE OF CORRECTION

PATENT NO. : 6,157,387
DATED : December 5, 2000
INVENTOR(S) : Naoya Kotani

It is certified that error appears in the above-identified patent and that said Letters Patent is hereby corrected as shown below:

Column 20,
Line 12, please change the phrase "according to claim 12" to -- according to claim 20 --;

Column 21,
Line 28, please change the phrase "according to claim 17" to -- according to claim 26 --;

Column 24,
Line 31, please change the phrase "according to claim 41" to -- according to claim 39 --;

Signed and Sealed this

Eleventh Day of June, 2002

Attest:

JAMES E. ROGAN
Attesting Officer    Director of the United States Patent and Trademark Office